US012643103B2

(12) United States Patent
Ports et al.

(10) Patent No.: US 12,643,103 B2
(45) Date of Patent: Jun. 2, 2026

(54) SYSTEMS, DEVICES AND METHODS FOR MULTIPLEXED ANALYSIS

(71) Applicant: IsoPlexis Corporation, Branford, CT (US)

(72) Inventors: Benjamin Ports, Guilford, CT (US); Igor Nikonorov, Whitestone, NY (US); Peter Tsiomplikas, Bridgeport, CT (US); Michael Kane, Branford, CT (US); Sergei Ivani, Branford, CT (US); Patrick Paczkowski, East Haven, CT (US); Luka Djapic, Branford, CT (US)

(73) Assignee: IsoPlexis Corporation, Branford, CT (US)

( * ) Notice: Subject to any disclaimer, the term of this patent is extended or adjusted under 35 U.S.C. 154(b) by 870 days.

(21) Appl. No.: 17/802,661

(22) PCT Filed: Feb. 26, 2021

(86) PCT No.: PCT/US2021/020052
§ 371 (c)(1),
(2) Date: Aug. 26, 2022

(87) PCT Pub. No.: WO2021/174099
PCT Pub. Date: Sep. 2, 2021

(65) Prior Publication Data
US 2023/0191409 A1 Jun. 22, 2023

Related U.S. Application Data

(60) Provisional application No. 62/982,472, filed on Feb. 27, 2020.

(51) Int. Cl.
*B01L 3/00* (2006.01)

(52) U.S. Cl.
CPC . *B01L 3/502761* (2013.01); *B01L 2200/0647* (2013.01); *B01L 2300/044* (2013.01); *B01L 2400/0481* (2013.01); *B01L 2400/082* (2013.01)

(58) Field of Classification Search
None
See application file for complete search history.

(56) References Cited

U.S. PATENT DOCUMENTS 5,020,123 A 5/1991 Thompson
5,858,801 A 1/1999 Brizzolara
(Continued)

FOREIGN PATENT DOCUMENTS

AU 2013240127 A1 10/2014
CN 102690786 A 9/2012
(Continued)

OTHER PUBLICATIONS

Adams et al., Multitarget magnetic activated cell sorter, Proceedings of the National Academy of Sciences, Nov. 2008, pp. 18165-18170.
(Continued)

*Primary Examiner* — Rebecca M Giere
(74) *Attorney, Agent, or Firm* — Fenwick & West LLP; Matthew Pavao; Andrew Henderson

(57) ABSTRACT

Embodiments of the current disclosure are directed to systems, methods and apparatus for the multiplexed analysis of biological material. In some embodiments, the apparatus may comprise an assembly including a first frame including a plurality of first openings; a capture agent slide; and a channel membrane.

28 Claims, 15 Drawing Sheets

(56) References Cited

U.S. PATENT DOCUMENTS 6,039,897 A 3/2000 Lochhead et al.
6,165,739 A 12/2000 Clatch
6,377,721 B1 4/2002 Walt et al.
6,429,027 B1 8/2002 Chee et al.
6,524,790 B1 2/2003 Kopf-Sill et al.
6,699,665 B1 3/2004 Kim et al.
6,924,153 B1 8/2005 Boehringer et al.
7,312,197 B2 12/2007 Gong et al.
7,381,375 B2 6/2008 Ravkin et al.
7,491,498 B2 2/2009 Lapidus et al.
7,541,444 B2 6/2009 Milton et al.
7,666,593 B2 2/2010 Lapidus
7,785,796 B2 8/2010 Balasubramanian et al.
8,105,845 B2 1/2012 Notcovich et al.
8,236,532 B2 8/2012 Ronaghi et al.
8,394,590 B2 3/2013 Kwong et al.
8,460,878 B2 6/2013 Walt et al.
8,492,165 B2 7/2013 Van et al.
8,753,816 B2 6/2014 Rigatti et al.
8,802,368 B2 8/2014 Lapidus
8,865,479 B2 10/2014 Love et al.
9,005,929 B2 4/2015 Ronaghi et al.
9,051,612 B2 6/2015 Zhao et al.
9,121,060 B2 9/2015 Milton et al.
9,188,586 B2 11/2015 Fan et al.
9,388,464 B2 7/2016 Milton et al.
9,409,987 B2 8/2016 Toporik et al.
9,453,258 B2 9/2016 Kain et al.
9,506,917 B2 11/2016 Fan et al.
9,567,645 B2 2/2017 Fan et al.
9,567,646 B2 2/2017 Fan et al.
9,598,736 B2 3/2017 Fan et al.
9,701,998 B2 7/2017 Hindson et al.
9,727,810 B2 8/2017 Fodor et al.
9,765,391 B2 9/2017 Swerdlow
9,824,870 B1 11/2017 Straume et al.
9,845,502 B2 12/2017 Fodor et al.
9,952,126 B2 4/2018 Fowler et al.
9,953,209 B2 4/2018 Adalsteinsson et al.
10,002,316 B2 6/2018 Fodor et al.
10,131,958 B1 11/2018 Fan et al.
10,137,426 B2 11/2018 Love et al.
10,151,003 B2 12/2018 Fan et al.
10,190,965 B2 1/2019 Handique et al.
10,208,356 B1 2/2019 Fan et al.
10,253,375 B1 4/2019 Fan et al.
10,273,541 B2 4/2019 Hindson et al.
10,274,486 B2 4/2019 Fan et al.
10,337,063 B1 7/2019 Brenner et al.
10,378,051 B2 8/2019 Meuleman et al.
10,391,492 B2 8/2019 Handique et al.
10,391,493 B2 8/2019 Handique et al.
10,400,280 B2 9/2019 Hindson et al.
10,436,700 B1 10/2019 Handique et al.
10,513,731 B2 12/2019 Milton et al.
10,584,366 B2 3/2020 Paczkowski et al.
10,619,196 B1 4/2020 Chee
10,633,702 B2 4/2020 Brenner et al.
10,641,700 B2 5/2020 Handique
10,676,789 B2 6/2020 Hindson et al.
10,718,007 B2 7/2020 Handique et al.
10,746,648 B2 8/2020 Handique
10,752,950 B2 8/2020 Hindson et al.
10,774,374 B2 9/2020 Frisen et al.
10,793,904 B2 10/2020 Swerdlow
10,821,440 B2 11/2020 Handique et al.
10,921,237 B2 2/2021 Handique
10,927,419 B2 2/2021 Fan et al.
10,928,389 B2 2/2021 Fan et al.
10,941,396 B2 3/2021 Fu et al.
10,954,570 B2 3/2021 Fan et al.
11,021,749 B2 6/2021 Hindson et al.
11,066,689 B2 7/2021 Paczkowski et al.
11,353,448 B2 6/2022 Xue et al.
11,493,508 B2 11/2022 Ng et al.
11,525,783 B2 12/2022 Tsiomplikas et al.
11,661,619 B2 5/2023 Paczkowski et al.
2001/0016320 A1 8/2001 He et al.
2002/0090649 A1 7/2002 Chan et al.
2002/0100714 A1 8/2002 Staats
2002/0131974 A1 9/2002 Segal
2002/0146745 A1 10/2002 Natan et al.
2003/0013091 A1 1/2003 Dimitrov
2003/0027342 A1 2/2003 Sheridan et al.
2003/0082601 A1 5/2003 Dill
2003/0096232 A1 5/2003 Kris et al.
2003/0104486 A1 6/2003 Selvan
2003/0127610 A1 7/2003 Gallagher
2003/0190608 A1 10/2003 Blackburn
2003/0190689 A1 10/2003 Crosby et al.
2004/0037739 A1 * 2/2004 McNeely .............. B01L 3/5085
422/417
2004/0092032 A1 5/2004 Winkler et al.
2004/0191124 A1 9/2004 Noetzel et al.
2004/0224321 A1 11/2004 Nicolau et al.
2004/0265889 A1 12/2004 Durham et al.
2005/0032144 A1 2/2005 Lombardi et al.
2005/0142033 A1 6/2005 Glezer et al.
2005/0197311 A1 9/2005 Cooper et al.
2005/0226779 A1 10/2005 Oldham et al.
2006/0165739 A1 7/2006 Komesvarakul et al.
2006/0246475 A1 11/2006 Peterson et al.
2006/0263818 A1 11/2006 Scherer et al.
2006/0286549 A1 12/2006 Sohn et al.
2007/0074972 A1 4/2007 Nassef et al.
2007/0122819 A1 5/2007 Wu et al.
2007/0202538 A1 8/2007 Glezer et al.
2007/0243535 A1 10/2007 Harris
2008/0200343 A1 8/2008 Clemens et al.
2008/0207461 A1 8/2008 Ermantraut et al.
2008/0317627 A1 12/2008 Shirai et al.
2009/0017455 A1 1/2009 Kwong et al.
2009/0036324 A1 2/2009 Fan et al.
2009/0053732 A1 2/2009 Vermesh et al.
2009/0098541 A1 4/2009 Southern et al.
2009/0137413 A1 5/2009 Mehta et al.
2009/0227043 A1 9/2009 Huang
2010/0009335 A1 1/2010 Joseph et al.
2010/0152054 A1 6/2010 Love et al.
2010/0213063 A1 8/2010 Zenhausern et al.
2010/0279882 A1 11/2010 Ronaghi et al.
2010/0297145 A1 11/2010 Tsujikawa et al.
2011/0034908 A1 2/2011 Hyde et al.
2011/0048952 A1 3/2011 Van Pelt et al.
2011/0177537 A1 7/2011 Nissum et al.
2011/0224913 A1 9/2011 Cui et al.
2012/0015824 A1 1/2012 Love et al.
2012/0156675 A1 6/2012 Lueerssen et al.
2012/0316074 A1 12/2012 Saxonov
2013/0274117 A1 10/2013 Church et al.
2013/0338047 A1 12/2013 Love et al.
2014/0044641 A1 2/2014 Toporik et al.
2014/0128281 A1 5/2014 Zhang et al.
2014/0170642 A1 6/2014 Huang et al.
2014/0307931 A1 10/2014 Gierahn et al.
2014/0336072 A1 11/2014 Krishnan et al.
2015/0078999 A1 3/2015 Heath et al.
2015/0086424 A1 3/2015 Putnam et al.
2015/0204862 A1 7/2015 Fan et al.
2015/0204864 A1 7/2015 Fan et al.
2016/0011189 A1 1/2016 Fan et al.
2016/0129445 A1 5/2016 Corey et al.
2016/0160169 A1 6/2016 Paczkowski et al.
2016/0167049 A1 6/2016 Narahara et al.
2016/0238594 A1 8/2016 Xue et al.
2016/0252495 A1 9/2016 Ricicova et al.
2017/0067887 A1 3/2017 Fan et al.
2017/0138942 A1 5/2017 Fan et al.
2018/0105855 A1 4/2018 Paczkowski et al.
2018/0335419 A1 11/2018 Love et al.
2019/0024153 A1 1/2019 Frisen et al.
2019/0144936 A1 5/2019 Gierahn et al.
2019/0195869 A1 6/2019 Fan et al.
2019/0285626 A1 9/2019 Ng et al.

(56) References Cited

U.S. PATENT DOCUMENTS

| | | | |
|---|---|---|---|
| 2019/0324028 | A1 | 10/2019 | Fan et al. |
| 2019/0376898 | A1 | 12/2019 | Tsiomplikas et al. |
| 2020/0166518 | A1 | 5/2020 | Mackay et al. |
| 2020/0239926 | A1 | 7/2020 | Paczkowski et al. |
| 2021/0388446 | A1 | 12/2021 | Abate et al. |
| 2022/0017858 | A1 | 1/2022 | Zheng et al. |
| 2022/0057388 | A1 | 2/2022 | Fan et al. |
| 2022/0136030 | A1 | 5/2022 | Paczkowski et al. |
| 2022/0390446 | A1 | 12/2022 | Ng et al. |
| 2023/0052346 | A1 | 2/2023 | Tsiomplikas et al. |
| 2023/0138672 | A1 | 5/2023 | Paczkowski et al. |
| 2023/0221328 | A1 | 7/2023 | Mackay et al. |

FOREIGN PATENT DOCUMENTS

| | | | |
|---|---|---|---|
| DE | 10127221 | A1 | 11/2002 |
| EP | 1816476 | A1 | 8/2007 |
| EP | 2336348 | A1 | 6/2011 |
| EP | 2414548 | B1 | 10/2015 |
| EP | 1451351 | B1 | 2/2017 |
| EP | 3241913 | A1 | 11/2017 |
| EP | 3480321 | A1 | 5/2019 |
| EP | 3248018 | B1 | 1/2020 |
| EP | 3262192 | B1 | 9/2020 |
| JP | 2003057236 | A | 2/2003 |
| JP | 2007536512 | A | 12/2007 |
| JP | 2010066146 | A | 3/2010 |
| WO | WO-9628538 | A1 | 9/1996 |
| WO | WO-02077259 | A2 | 10/2002 |
| WO | WO-03048736 | A2 | 6/2003 |
| WO | WO-2005007892 | A1 | 1/2005 |
| WO | WO-2005081867 | A2 | 9/2005 |
| WO | WO-2005090972 | A1 | 9/2005 |
| WO | WO-2006117541 | A1 | 11/2006 |
| WO | WO-2007014267 | A2 | 2/2007 |
| WO | WO-2007035633 | A2 | 3/2007 |
| WO | WO-2008016680 | A1 | 2/2008 |
| WO | WO-2009012340 | A2 | 1/2009 |
| WO | WO-2009012343 | A2 | 1/2009 |
| WO | WO-2010065929 | A2 | 6/2010 |
| WO | WO-2010085275 | A1 | 7/2010 |
| WO | WO-2010117620 | A2 | 10/2010 |
| WO | WO-2012022482 | A1 | 2/2012 |
| WO | WO-2012083225 | A2 | 6/2012 |
| WO | WO-2013090404 | A2 | 6/2013 |
| WO | WO-2013130674 | A1 | 9/2013 |
| WO | WO-2013148448 | A1 | 10/2013 |
| WO | WO-2014031997 | A1 | 2/2014 |
| WO | WO-2014052989 | A2 | 4/2014 |
| WO | WO-2015031691 | A1 | 3/2015 |
| WO | WO-2016009446 | A2 | 1/2016 |
| WO | WO-2016057552 | A1 | 4/2016 |
| WO | WO-2016057705 | A1 | 4/2016 |
| WO | WO-2016090148 | A1 | 6/2016 |
| WO | WO-2016090320 | A1 | 6/2016 |
| WO | WO-2016118915 | A1 | 7/2016 |
| WO | WO-2016130704 | A2 | 8/2016 |
| WO | WO-2016138496 | A1 | 9/2016 |
| WO | WO-2016145409 | A1 | 9/2016 |
| WO | WO-2018049418 | A1 | 3/2018 |
| WO | WO-2018098372 | A1 | 5/2018 |
| WO | WO-2019213254 | A1 | 11/2019 |

OTHER PUBLICATIONS

Adler et al., Detection of femtogram amounts of biogenic amines using self-assembled DNA-protein nanostructures Nature Methods, 2005, pp. 147-149.

Amir et al., viSNE enables visualization of high dimensional single-cell data and reveals phenotypic heterogeneity of leukemia, Nature biotechnology, Jun. 2013, pp. 545-552.

Anderson et al., The human plasma proteome: history, character, and diagnostic prospects, Molecular & cellular proteomics, Nov. 2002, pp. 845-867.

Anonymous: "Code Plex", Internet Article, 2020, pp. 1-12. Retrieved from: URL:https://offers.thescientist.com/hubfs/downloads/TS/TS_Isoplexis_2020/IsoPiexis_CodePiex_eBook/Iso Plexis CodePiex Ebook final jr ck.pdf.

Arenkov et al., Protein microchips: use for immunoassay and enzymatic reactions, Analytical Biochemistry, Feb. 2000, pp. 123-131.

Armstrong et al., Suspension arrays for high throughput, multiplexed single nucleotide polymorphism genotyping, Cytometry: The Journal of the International Society for Analytical Cytology, Jun. 2000, pp. 102-108.

Ashton et al., Smoking and carboxyhaemoglobin, The Lancet, Oct. 1973, pp. 857-858.

Bailey et al., DNA-Encoded Antibody Libraries: A Unified Platform for Multiplexed Cell Sorting and Detection of Genes and Proteins, Journal of the American Chemical Society, Feb. 2007, pp. 1959-1967.

Baines et al., Inhibition of RAS for cancer treatment: the search continues, NIH Public Access, Author Manuscript, Future medicinal chemistry, Oct. 2011, pp. 1787-1808.

Balaban et al., Bacterial persistence as a phenotypic switch. Science, Sep. 2004, pp. 1622-1625.

BD Biosciences, Purified Mouse Anti-Human IL-2, 2007, 1 page. Retreived from: http://www.bdbiosciences.com/ptProduct.jsp?prodid=6725.

BD Biosciences, Technical data sheet: Purified mouse anti-human IL-2 monoclonal antibody ELISA capture, 2003, 2 pages. Retrieved from: http://www.bdbiosciences.com/ds/pm/tds/555051.pdf.

Becker et al., Direct readout of protein-protein interactions by mass spectrometry from protein-DNA microarrays, Angewandte Chemie International Edition, Nov. 2005, pp. 7635-7639.

Bendall et al., From single cells to deep phenotypes in cancer, Nature biotechnology, Jul. 2012, pp. 639-647.

Bendall et al., Single-cell mass cytometry of differential immune and drug responses across a human hematopoietic continuum, Science, May 2011, pp. 687-696.

Bernard et al., Micromosaic immunoassays, Analytical chemistry, Jan. 2001, pp. 8-12.

Betensky et al., Influence of unrecognized molecular heterogeneity on randomized clinical trials, Journal of clinical oncology, May 2002, 2495-9.

Boozer et al., DNA directed protein immobilization on mixed ssDNA/oligo (ethylene glycol) self-assembled monolayers for sensitive biosensors, Analytical chemistry, Dec. 2004, pp. 6967-6972.

Boozer et al., DNA-directed protein immobilization for simultaneous detection of multiple analytes by surface plasmon resonance biosensor, Analytical Chemistry, Mar. 2006, pp. 1515-1519.

Breslauer et al., Microfluidics-based systems biology, Molecular Biosystems, 2006, pp. 97-112.

Bunimovich et al., Quantitative real-time measurements of DNA hybridization with alkylated nonoxidized silicon nanowires in electrolyte solution, Journal of the American Chemical Society, Dec. 2006, pp. 16323-16331.

Campbell et al., A monomeric red fluorescent protein, Proceedings of the National Academy of Sciences, Jun. 2002, pp. 7877-7882.

Chattopadhyay et al., Single-cell technologies for monitoring immune systems, Nature immunology, Feb. 2014, pp. 128-135.

Chen et al., Discordant protein and mRNA expression in lung adenocarcinomas, Molecular & cellular proteomics, Apr. 2002, pp. 304-313.

Chen et al., Plasma proteome of severe acute respiratory syndrome analyzed by two-dimensional gel electrophoresis and mass spectrometry, Proceedings of the National Academy of Sciences, Dec. 2004, pp. 17039-17044.

Chen et al., Marked differences in human melanoma antigen-specific T cell responsiveness after vaccination using a functional microarray, PLoS medicine, Oct. 2005, 13 pages.

Chen et al., Multiplexed analysis of glycan variation on native proteins captured by antibody microarrays, Nature methods, May 2007, pp. 437-444.

(56) References Cited

OTHER PUBLICATIONS

Chen et al., Microfluidic devices targeting blood cell lysis, On-Chip Pretreatment of Whole Blood by Using MEMS Technology, 2012, pp. 64-83.
Cheong et al., Using a microfluidic device for high-content analysis of cell signaling, Science signaling, Jun. 2009, 31 pages.
Choi et al., Immuno-hybridization chain reaction for enhancing detection of individual cytokine-secreting human peripheral mononuclear cells, Analytical chemistry, Sep. 2011, pp. 6890-6895.
Chou et al., Sorting biomolecules with microdevices, Electrophoresis: An International Journal, Jan. 2000, pp. 81-90.
Coussens et al., Inflammation and cancer, Nature, Dec. 2002, pp. 860-867.
Crowley et al., Isolation of plasma from whole blood using planar microfilters for lab-on-a-chip applications, Lab on a Chip, 2005, pp. 922-929.
Dandy et al., Array feature size influences nucleic acid surface capture in DNA microarrays, Proceedings of the National Academy of Sciences, May 2007, pp. 8223-8228.
Das, et al., A General Synthetic Approach for Designing Epitope Targeted Macrocyclic Peptide Ligands, Angewandte Chemie, 2015, pp. 13219-13224.
De Marzo et al., Inflammation in prostate carcinogenesis, Nature Reviews Cancer, Apr. 2007, pp. 256-269.
Degenaar et al., A method for micrometer resolution patterning of primary culture neurons for SPM analysis, The journal of biochemistry, Sep. 2001, pp. 367-376.
Dehqanzada et al., Assessing serum cytokine profiles in breast cancer patients receiving a HER2/neu vaccine using Luminex® technology, Oncology reports, Mar. 2007, pp. 687-694.
Delamarche et al., Patterned delivery of immunoglobulins to surfaces using microfluidic networks, Science, May 1997, pp. 779-781.
Deyle et al., A protein-targeting strategy used to develop a selective inhibitor of the E17K point mutation in the PH domain of Akt1, Nature chemistry, May 2015, pp. 455-462.
Dirks et al., Paradigms for computational nucleic acid design, Nucleic acids research, Mar. 2004, pp. 1392-1403.
Downward, Targeting RAS Signalling Pathways in Cancer Therapy, Nature Reviews, Jan. 2003, 22 pages.
Elitas, et al., A microchip platform for interrogating tumor-macrophage paracrine signaling at the single-cell level, Lab on a Chip, 2014, pp. 3582-3588.
Engvall et al., Enzyme-linked immunossorbent assay, ELISA. 3. Quantitation of specific antibodies by enzyme-labelled anti-immunglobulin in antigen-coated tubes, Journal of Immunology, 1972, pp. 129-135.
Erickson et al., Modeling of DNA hybridization kinetics for spatially resolved biochips, Analytical biochemistry, Jun. 2003, pp. 186-200.
Eyer et al., Implementing enzyme-linked immunosorbent assays on a microfluidic chip to quantify intracellular molecules in single cells, Analytical chemistry, Mar. 2013, pp. 3280-3287.
Fainerman et al., Adsorption of surfactants and proteins at fluid interfaces, Colloids and Surfaces A: Physicochemical and Engineering Aspects, Dec. 1998, pp. 141-165.
Fan et al., Integrated barcode chips for rapid, multiplexed analysis of proteins in microliter quantities of blood, Nature biotechnology, Dec. 2008, pp. 1373-1378.
Fuji et al., Clinical-scale high-throughput human plasma proteome analysis: Lung adenocarcinoma, Proteomics, Mar. 2005, pp. 1150-1159.
Fung, Stochastic flow in capillary blood vessels, Microvascular research, Jan. 1973, pp. 34-48.
Gallbraith, et al., Remapping disparate images for coincidence, Journal of microscopy, Nov. 1993, pp. 163-176.
Gorelik et al., Multiplexed immunobead-based cytokine profiling for early detection of ovarian cancer, Cancer Epidemiology Biomarkers & Prevention, Apr. 2005, pp. 981-987.
Green et al., Capturing the uncultivated majority, Current opinion in biotechnology, Jun. 2006, pp. 236-240.
Groves et al., In vitro maturation of clonal CD4+ CD8+ cell lines in response to TCR engagement., Journal of immunology, May 1995, pp. 5011-5022.
Guan et al., Recombinant protein-based enzyme-linked immunosorbent assay and immunochromatographic tests for detection of immunoglobulin G antibodies to severe acute respiratory syndrome (SARS) coronavirus in SARS patients, Clinical and Vaccine Immunology, Mar. 2004, pp. 287-291.
Hainfeld et al., Silver-and gold-based autometallography of Nanogold, Gold and silver staining: techniques in molecular morphology, Apr. 2002, pp. 29-46.
Han et al., Multidimensional analysis of the frequencies and rates of cytokine secretion from single cells by quantitative microengraving, Lab on a Chip, 2010, pp. 1391-1400.
Han et al., Polyfunctional responses by human T cells result from sequential release of cytokines, Proceedings of the National Academy of Sciences, Jan. 2012, pp. 1607-1612.
Heath et al., Nanotechnology and cancer, Annu. Rev. Med., Feb. 2008, pp. 251-265.
Henderson, et al., Chimeric antigen receptor-redirected T cells display multifunctional capacity and enhanced tumor-specific cytokine secretion upon secondary ligation of chimeric receptor, Immunotherapy, Jun. 2013, pp. 577-590.
Henshall et al., Validating biomarkers with VeraCode, Genetic Engineering & Biotechnology News, Oct. 2007, 7 pages.
Holland et al., Detection of specific polymerase chain reaction product by utilizing the 5'—3'exonuclease activity of Thermus aquaticus DNA polymerase, Proceedings of the National Academy of Sciences, Aug. 1991, pp. 7276-7280.
Hong et al., A nanoliter-scale nucleic acid processor with parallel architecture, Nature biotechnology, Apr. 2004, pp. 435-439.
Hong et al., Integrated nanoliter systems, Nature biotechnology, Oct. 2003, pp. 1179-1183.
Hsieh et al., Systematical evaluation of the effects of sample collection procedures on low-molecular-weight serum/plasma proteome profiling, Proteomics, May 2006, pp. 3189-3198.
Huang et al., Detection of multiple proteins in an antibody-based protein microarray system, Journal of immunological methods, Sep. 2001, pp. 1-3.
Huang et al., Continuous particle separation through deterministic lateral displacement, Science, May 2004, pp. 987-990.
Huang et al., Counting low-copy number proteins in a single cell, Science, Jan. 2007, pp. 81-84.
Huber et al., Comparison of proteomic and genomic analyses of the human breast cancer cell line T47D and the antiestrogen-resistant derivative T47D-r, Molecular & Cellular Proteomics, Jan. 2004, pp. 43-55.
Hughes, et al., Single-cell western blotting, Nature methods, Jul. 2014, pp. 749-755.
Hughes et al., Molecular monitoring of chronic myeloid leukemia, Seminars in hematology, Apr. 2003, pp. 62-68.
Iannone et al., Multiplexed single nucleotide polymorphism genotyping by oligonucleotide ligation and flow cytometry, Cytometry: The Journal of the International Society for Analytical Cytology, Feb. 2000, pp. 131-140.
Inerowicz et al., Multiprotein immunoassay arrays fabricated by microcontact printing, Langmuir, Jun. 2002, 5263-8.
Jeon et al., Protein-surface interactions in the presence of polyethylene oxide: I. Simplified theory, Journal of colloid and interface science, Mar. 1991, pp. 149-158.
Kim et al., Establishment and characterization of BALB/c lymphoma lines with B cell properties, The Journal of Immunology, Feb. 1979, pp. 549-554.
Kiyonaka et al., Semi-wet peptide/protein array using supramolecular hydrogel, Nature materials, Jan. 2004, pp. 58-64.
Kochenderfer et al., B-cell depletion and remissions of malignancy along with cytokine-associated toxicity in a clinical trial of anti-CD19 chimeric-antigen-receptor-transduced T cells, Blood, The Journal of the American Society of Hematology, Mar. 2012, pp. 2709-2720.

(56) References Cited

OTHER PUBLICATIONS

Kozlov et al., Efficient strategies for the conjugation of oligonucleotides to antibodies enabling highly sensitive protein detection, Biopolymers: Original Research on Biomolecules, Apr. 2004, pp. 621-630.
Krzywinski, et al.; Circos: an information aesthetic for comparative genomics, Genome research, Sep. 2009, pp. 1639-1645.
Kwak, et al., Single-cell protein secretomic signatures as potential correlates to tumor cell lineage evolution and cell-cell interaction, Frontiers in oncology, Feb. 2013, 8 pages.
Kwon et al., Antibody arrays prepared by cutinase-mediated immobilization on self-assembled monolayers, Analytical Chemistry, Oct. 2004, pp. 5713-5720.
Kwong et al., Synchronous global assessment of gene and protein expression in colorectal cancer progression, Genomics, Aug. 2005, pp. 142-158.
Lamb et al., The Connectivity Map: using gene-expression signatures to connect small molecules, genes, and disease, Science, Sep. 2006, pp. 1929-1935.
Lambeck et al., Serum cytokine profiling as a diagnostic and prognostic tool in ovarian cancer: a potential role for interleukin 7, Clinical Cancer Research, Apr. 2007, pp. 2385-2391.
Lange et al., Microcontact printing of DNA molecules, Analytical chemistry, Mar. 2004, pp. 1641-1647.
Lathrop, et al., Therapeutic potential of the plasma proteome, Curr. Opin. Mol. Ther., Jun. 2003, pp. 250-257.
Lecault et al., High-throughput analysis of single hematopoietic stem cell proliferation in microfluidic cell culture arrays, Nature methods, Jul. 2011, pp. 581-586.
Lee et al., Quantitative and dynamic assay of single cell chemotaxis, Integrative Biology, Apr. 2012, pp. 381-390.
Lee et al., SPR imaging measurements of 1-D and 2-D DNA microarrays created from microfluidic channels on gold thin films, Analytical Chemistry, Nov. 2001, pp. 5525-5531.
Lin et al., Evidence for the presence of disease-perturbed networks in prostate cancer cells by genomic and proteomic analyses: a systems approach to disease, Cancer research, Apr. 2005, pp. 3081-3091.
Lin et al., A cytokine-mediated link between innate immunity, inflammation, and cancer, The Journal of clinical investigation, May 2007, pp. 1175-1183.
Liotta et al., Protein microarrays: meeting analytical challenges for clinical applications, Cancer cell, Apr. 2003, pp. 317-325.
Liu et al., Photopatterning of antibodies on biosensors, Bioconjugate Chemistry, Nov. 2000, pp. 755-761.
Love et al., A microengraving method for rapid selection of single cells producing antigen-specific antibodies, Nature biotechnology, Jun. 2006, pp. 703-707.
Lu et al., High-throughput secretomic analysis of single cells to assess functional cellular heterogeneity, Analytical chemistry, Feb. 2013, pp. 2548-2556.
Ivanova et al., Polymer microstructures fabricated via laser ablation used for multianalyte protein microassay, Langmuir, Nov. 2002, pp. 9539-9546.
Ma, et al., A clinical microchip for evaluation of single immune cells reveals high functional heterogeneity in phenotypically similar T cells, Nature medicine, Jun. 2011, pp. 738-743.
Ma, et al., Multifunctional T-cell analyses to study response and progression in adoptive cell transfer immunotherapy, Cancer discovery, Apr. 2013, pp. 418-429.
Macbeath et al., Printing proteins as microarrays for high-throughput function determination, Science, Sep. 2000, pp. 1760-1763.
Madoz-Gurpide et al., Protein based microarrays: a tool for probing the proteome of cancer cells and tissues, PROTEOMICS: International Edition, Oct. 2001, pp. 1279-1287.
Martin, Molecular biology of breast cancer, Clinical and Translational Oncology, Jan. 2006, pp. 7-14.
Mellinghoff et al., Molecular determinants of the response of glioblastomas to EGFR kinase inhibitors, New England Journal of Medicine, Nov. 2005, pp. 2012-2024.
Michel et al., Printing meets lithography: Soft approaches to high-resolution patterning, IBM Journal of Research and Development, Sep. 2001, pp. 697-719.
Michor, et al., The origins and implications of intratumor heterogeneity, Cancer Prev Ress., Nov. 2010, pp. 1361-1364.
Mischel et al., DNA-microarray analysis of brain cancer: molecular classification for therapy, Nature Reviews Neuroscience, Oct. 2004, pp. 782-792.
Nagrath et al., Isolation of rare circulating tumour cells in cancer patients by microchip technology, Nature, Dec. 2007, pp. 1235-1239.
Nam et al., Nanoparticle-based bio-bar codes for the ultrasensitive detection of proteins, Science, Sep. 2003, pp. 1884-1886.
Nam et al., Nanoparticle-based bio-bar codes for the ultrasensitive detection of proteins, Science, Supporting Materia, Sep. 2003, pp. 1884-1886.
Nathanson, et al., Co-targeting of convergent nucleotide biosynthetic pathways for leukemia eradication, Journal of Experimental Medicine, Mar. 2014, pp. 473-486.
Niemeyer, Functional devices from DNA and proteins, Nano Today, Apr. 2007, pp. 42-52.
Niemeyer et al., Immuno-PCR: high sensitivity detection of proteins by nucleic acid amplification, Trends in biotechnology, Apr. 2005, pp. 208-216.
Olanrewaju et al., Capillary microfluidics in microchannels: from microfluidic networks to capillaric circuits, Lab on a Chip, 2018, pp. 2323-2347.
Ostrem, J.M et al., K-Ras(G12C) inhibitors allosterically control GTP affinity and effector interactions, Nature, Nov. 28, 2013, 14 pages.
Ottesen et al., Microfluidic digital PCR enables multigene analysis of individual environmental bacteria, Science, Dec. 2006, pp. 1464-1467.
Pal et al., Differential phosphoprotein mapping in cancer cells using protein microarrays produced from 2-D liquid fractionation, Analytical chemistry, Feb. 2006, pp. 702-710.
Park et al., Array-based electrical detection of DNA with nanoparticle probes, Science, Feb. 2002, pp. 1503-1506.
Peluso et al., Optimizing antibody immobilization strategies for the construction of protein microarrays, Analytical biochemistry, Jan. 2003, pp. 113-124.
Phillips, Rapid analysis of inflammatory cytokines in cerebrospinal fluid using chip-based immunoaffinity electrophoresis, Electrophoresis, Jun. 2004, pp. 1652-1659.
Picelli et al., Single-cell RNA-sequencing: the future of genome biology is now, RNA biology, May 2017, pp. 637-650.
Pirrung, How to make a DNA chip, Angewandte, Chemie International Edition, Apr. 2002, pp. 1276-1289.
Prados et al., Temozolomide + OSI-774, American Society of Clinical Oncology, 2003, 29 pages.
Prime et al., Self-assembled organic monolayers: Model systems for studying adsorption of proteins at aurfaces, Science, May 1991, pp. 1164-1167.
Prime et al., Adsorption of proteins onto surfaces containing end-attached oligo (ethylene oxide): a model system using self-assembled monolayers, Journal of the American Chemical Society, Nov. 1993, pp. 10714-10721.
Quake et al., From micro-to nanofabrication with soft materials, Science, Nov. 2000, pp. 1536-1540.
Radich et al., Gene expression changes associated with progression and response in chronic myeloid leukemia, Proceedings of the National Academy of Sciences, Feb. 2006, pp. 2794-2799.
Ramsden, Puzzles and paradoxes in protein adsorption, Chemical Society Reviews, 1995, pp. 73-78.
Rich et al., Phase II trial of gefitinib in recurrent glioblastoma, Journal of Clinical Oncology, Jan. 2004, pp. 133-142.
Rowat et al., Tracking lineages of single cells in lines using a microfluidic device, Proceedings of the National Academy of Sciences, Oct. 2009, pp. 18149-18154.

(56) References Cited

OTHER PUBLICATIONS

Sachdeva et al., Cytokine quantitation: technologies and applications, Frontiers in Bioscience-Landmark, May 2007, pp. 4682-4695.
Sano et al., Immuno-PCR: very sensitive antigen detection by means of specific antibody-DNA conjugates, Science, Oct. 1992, pp. 120-122.
Sarkar et al., Microfluidic probe for single-cell analysis in adherent tissue culture, Nature communications, Mar. 2014, 8 pages.
Schena et al., Quantitative monitoring of gene expression patterns with a complementary DNA microarray, Science, Oct. 1995, pp. 467-470.
Schubbert et al., Hyperactive Ras in developmental disorders and cancer, Nature Reviews Cancer, Apr. 2007, pp. 295-308.
Schweitzer et al., Multiplexed protein profiling on microarrays by rolling-circle amplification, Nature biotechnology, Apr. 2002, pp. 359-365.
Sedgwick et al., Lab-on-a-chip technologies for proteomic analysis from isolated cells, Journal of the Royal Society Interface, Oct. 2008, pp. S123-S130.
Seigel et al., On-line detection of nonspecific protein adsorption at artificial surfaces, Analytical Chemistry, Aug. 1997, pp. 3321-3328.
Shi et al., Single-cell proteomic chip for profiling intracellular signaling pathways in single tumor cells, Proceedings of the National Academy of Sciences, Jan. 2012, pp. 419-424.
Shin et al., Chemistries for patterning robust DNA microbarcodes enable multiplex assays of cytoplasm proteins from single cancer cells, ChemPhysChem., Oct. 2010, pp. 3063-3069.
Shin et al., Protein signaling networks from single cell fluctuations and information theory profiling, Biophysical journal, May 2011, pp. 2378-2386.
Sia et al., Microfluidic devices fabricated in poly (dimethylsiloxane) for biological studies, Electrophoresis, Nov. 2003, pp. 3563-3576.
Soen et al., Detection and Characterizationof Cellular Immune Responses Using Peptide-MHC Microarrays, PLoS biology, Dec. 2003, 10 pages.
Sorger, Microfluidics closes in on point-of-care assays, Nature biotechnology, Dec. 2008, pp. 1345-1346.
Spiro et al., A bead-based method for multiplexed identification and quantitation of DNA sequences using flow cytometry, Applied and Environmental Microbiology, Oct. 2000, pp. 4258-4265.
Svanes et al., Variations in small blood vessel hematocrits produced in hypothermic rats by micro-occlusion, Microvascular Research, Oct. 1968, pp. 210-220.
Taton et al., DNA array detection with nanoparticle probes, Science, Sep. 2000, pp. 1757-1760.
Thirumalapura et al., Lipopolysaccharide microarrays for the detection of antibodies, Journal of immunological methods, Mar. 2005, pp. 73-81.
Thorsen et al., Microfluidic large-scale integration, Science, Oct. 2002, pp. 580-584.
Thuillier et al., Development of a low cost hybrid Si/PDMS multi-layered pneumatic microvalve, Microsystem Technologies, 2005, pp. 180-185.
Tian et al., Integrated genomic and proteomic analyses of gene expression in mammalian cells, Molecular & Cellular Proteomics, Oct. 2004, pp. 960-969.
Toner et al., Blood-on-a-chip, Annu. Rev. Biomed. Eng., Aug. 2005, pp. 77-103.
Toure et al., Small-molecule PROTACS: new approaches to protein degradation, Angewandte Chemie International Edition, Feb. 2016, pp. 1966-1973.
Unger et al., Monolithic microfabricated valves and pumps by multilayer soft lithography, Science, Apr. 2000, pp. 113-116.
Unknown Author, Isolight System Guide, Internet Article, 2018, pp. 1-24. Retrieved from: U Rl: http://isoplexis.com/wp-contenVuploads/20 18/04/Isolight-User -Manual-1. pdf.
Van Duijn et al., Detection of genetically modified organisms in foods by protein-and DNA-based techniques: bridging the methods, Journal of AOAC International, May 2002, pp. 787-791.
Wacker, DDI-μFIA—A Readily Configurable Microarray-Fluorescence Immunoassay Based on DNA-Directed Immobilization of Proteins, ChemBioChem, Apr. 2004, pp. 453-459.
Wang, et al., A self-powered, one-step chip for rapid, quantitative and multiplexed detection of proteins from pinpricks of whole blood, Lab on a Chip, 2010, pp. 3157-3162.
Wang, et al., Single cell analysis: the new frontier in 'omics', Trends Biotechnol., Jun. 2010, pp. 281-290.
Wegner et al., Fabrication of histidine-tagged fusion protein arrays for surface plasmon resonance imaging studies of protein-protein and protein-DNA interactions, Analytical chemistry, Sep. 2003, pp. 4740-4746.
Wei et al., Microchip platforms for multiplex single-cell functional proteomics with applications to immunology and cancer research, Genome medicine, Aug. 2013, pp. 1-2.
Whitesides et al., Soft lithography in biology and biochemistry, Annual review of biomedical engineering, Aug. 2001, pp. 335-373.
Wise, et al., Glutamine addiction: a new therapeutic target in cancer, Trends in biochemical sciences, Aug. 2010, pp. 427-433.
Wysocki et al., "Panning" for lymphocytes: a method for cell selection, Proceedings of the National Academy of Sciences, Jun. 1978, pp. 2844-2848.
Yamanaka et al., Single-cell analysis of the dynamics and functional outcomes of interactions between human natural killer cells and target cells, Integrative Biology, Sep. 2012, pp. 1175-1184.
Yang et al., A microfluidic device for continuous, real time blood plasma separation, Lab on a Chip, 2006, pp. 871-880.
Yang, et al., Using a cross-flow microfluidic chip and external crosslinking reaction for monodisperse TPP-chitosan microparticles, Sensors and actuators B, 2007, pp. 510-516.
Yu et al., Contextual interactions determine whether the *Drosophila homeodomain* protein, Vnd, acts as a repressor or activator, Nucleic Acids Research, Jan. 2005, pp. 1-2.
Yu et al., Microfluidics-based single-cell functional proteomics for fundamental and applied biomedical applications, Annual review of analytical chemistry, Jun. 2014, pp. 275-295.
Yu et al., Analysis of the surface, secreted, and intracellular proteome of Propionibacterium acnes, EuPA Open Proteomics, Dec. 2015, pp. 1-7.
Zhang et al., Sequencing genomes from single cells by polymerase cloning, Nature biotechnology, Jun. 2006, pp. 680-686.
Zhao et al., High-affinity TCRs generated by phage display provide CD4+ T cells with the ability to recognize and kill tumor cell lines, The Journal of Immunology, Nov. 2007, pp. 5845-5854.
Zimmermann et al., Modeling and optimization of high-sensitivity, low-volume microfluidic-based surface immunoassays, Biomedical microdevices, Jun. 2005, pp. 99-110.

* cited by examiner

Completed Assembly + Base Removed to Highlight Flow Cell Path

SYSTEMS, DEVICES AND METHODS FOR MULTIPLEXED ANALYSIS

CROSS REFERENCE TO RELATED APPLICATIONS

This application is a U.S. National Phase Application, filed under 35 U.S.C. § 371 (c), of International Application No. PCT/US2021/020052, filed Feb. 26, 2021, which claims the benefit of provisional application U.S. Ser. No. 62/982,472, filed Feb. 27, 2020, the entire contents of each of which are herein incorporated by reference.

BACKGROUND OF THE DISCLOSURE

Multiplexed analysis biological components of biological samples, either as single cells, cell populations, or as lysates is of great utility in the areas of basic research, diagnostics, and therapeutics. Robust, user-friendly, and more economical technologies to facilitate said multiplexed analyses remain of great need to the medical and research communities. Automated devices, systems, and methods that improve accuracy, sensitivity, and reliability while reducing complexity of the overall device and/or system would hugely benefit the medical and research community by facilitating the discovery of novel therapeutics and the ability to directly monitor patients undergoing treatments including chemotherapies and immunotherapies.

SUMMARY OF AT LEAST SOME OF THE EMBODIMENTS OF THE DISCLOSURE

Embodiments of the present disclosure are directed to methods, systems and devices for the multiplexed analysis of biological components including proteins, antibodies, nucleic acids, and metabolites. In some embodiments, the device may be configured to analyze a plurality of samples while preventing sample cross-contamination by providing a substrate comprising microscale features for directing and retaining samples in discrete positions relative to a surface comprising a plurality of capture agents that bind to distinct biological components of the sample.

Accordingly, in some embodiments, a multiplex assay device (MAD) configured for at least one of multiplexed analysis of biological material and a cell suspension incubator is provided and comprises or otherwise includes a first frame, comprising a first side and a second side, including a plurality of first openings arranged in a plurality of rows and each first opening extends from a first side of the first frame to a second side of the first frame. The first frame further comprises at least one input opening wherein the at least one input opening is arranged on an end of the first frame and wherein the at least one input opening extends from the first side of the first frame to the second side of the first frame and the at least one input opening extends from the first side of the first frame to the second side of the first frame. The first frame further comprises at least one output opening where the at least one output opening is arranged on an end of the first frame, the at least one output opening extends from the first side of the first frame to the second side of the first frame and the at least one output opening is configured for exhausting a flow.

In addition, the above-noted embodiments may further include a capture agent (CA) slide and a channel membrane there the channel membrane is configured with a plurality of elongated slots configured as channels.

Such embodiments may include one and/or another (in some embodiments, a plurality of, in further embodiments, a majority of, and in further embodiments, all of) of the following steps, features, clarifications, structures, objectives, advantages, or functionality (as applicable), leading to yet further embodiments of the present disclosure:

- a second frame, where in some embodiments:
  - the first frame can be configured to removably couple with the second frame; and/or
  - the first frame and second frame can be removably coupled such that the CA slide and channel membrane are arranged therebetween;
- a cover membrane configured to cover the plurality of first openings, and in some embodiments the cover membrane can be configured to cover the first openings after a biological material sample has been pipetted into at least one of the first openings;
- each first opening can include identifiable indicia;
- at least one of the first openings in each row can correspond to a designated background opening (BO) for receiving background medium;
- at least one capillary stop can be arranged adjacent at least one of the plurality of first openings, where in some embodiments:
  - the at least one capillary stop can be configured to prevent cross-contamination between adjacent first openings; and/or
  - the at least one capillary stop can be configured to prevent cross-contamination between at least one first opening of a first row of the plurality of rows and at least one first opening of a second row of the plurality of rows adjacent the first row;
- each channel of the channel membrane can extend substantially from a first end of the channel membrane to a second end of the channel membrane,
- the channels of the channel membrane include a first channel and a last channel;
- the channel membrane includes a first side for positioning adjacent the first frame, and a second side to overlay the CA slide such that capture agents contained on the slide are within each channel of the plurality of channels;
- at least one flexible seal, where in some embodiments:
  - the at least one flexible seal can be provided for the at least one input opening;
  - the at least one flexible seal includes a pair of flexible seals, where one can be arranged for sealing the at least one input opening and one can be arranged for sealing the at least one output opening;
  - the at least one flexible seal can be arranged within respective opening or recess one at least one frame of the MAD; and/or
  - at least one flexible seal can be provided at a first end of the first frame, and another flexible seal is provided at a second, opposite end of the first frame;
- a coded label for identifying the MAD;
- the second frame can include an opening so as to image the side of the CA slide and channels established by the channel membrane facing thereto;
- each channel of the channel membrane can be positioned below at least one first opening of each row of first openings, such that, in some embodiments, a sample loaded into a respective first opening proliferates along at least a portion of the channel to interact with capture agents of the slide;
- and the first frame can include a plurality of passages that:

connect the at least one input to the at least one output via the plurality of channels of the channel membrane to establish a serpentine, serial channel;

include a first passage connecting the at least one input to an end of the first channel of the channel membrane;

include a second passage connecting the at least one output to an end of the last channel of the channel membrane; and/or include a plurality of third passages each for connecting every other adjacent end of adjacent channels of the channel membrane (e.g., so as to establish the serpentine channel from the at least one input, serially through each channel, and optionally, to the at least one output).

In some embodiments, a multiplex assay device (MAD) configured for multiplexed analysis of biological material is provided. The MAD includes, a first frame including a plurality of first openings arranged in a plurality of rows, a plurality of capillary stops arranged adjacent each of the plurality of first openings configured to prevent cross-contamination between at least one first opening of a first row of the plurality of rows and at least one first opening of a second row of the plurality of rows adjacent the first row, at least one input opening arranged on a first end of the first frame and extending from the first side of the first frame to the second side of the first frame and configured for receiving a flow, and at least one output opening arranged on a second end of the frame opposite the first end and extending from the first side of the frame to the second side of the frame and configured for exhausting the flow. The MAD also includes a first membrane configured to cover the plurality of first openings after a biological material sample has been pipetted into at least one of the first openings, a capture agent (CA) slide, and a channel membrane configured with a plurality of elongated slots configured as channels, where each extends substantially from a first end of the channel membrane to a second end of the channel membrane. The channels include a first channel and a last channel, with a first side for positioning adjacent the first frame, and a second side to overlay the CA slide such that capture agents contained on the slide are within each channel of the plurality of channels. The MAD further includes a second frame, a pair of flexible seals, one each provided for the at least one input opening and the at least one output opening, and arranged, respectively, at a first end and a second end of the assembly adjacent or within a recess of the second housing or frame. The MAD also includes a coded label for identifying the MAD.

Such embodiments may include one and/or another (in some embodiments, a plurality of, in further embodiments, a majority of, and in further embodiments, all of) of the following steps, features, clarifications, structures, objectives, advantages, or functionality (as applicable), leading to yet further embodiments of the present disclosure:

each first opening includes identifiable indicia extends from a first side of the first frame to a second side of the first frame;

each row includes a designated background opening (BO) for receiving background medium;

the first frame is configured to removably mate with the second frame such that the CA slide and channel membrane are arranged therebetween;

the second frame includes an opening so as to image the side of the CA slide and channels established by the channel membrane facing thereto;

each channel of the channel membrane is positioned below at least one first opening of each row of first openings, such that a sample loaded into a respective first opening proliferates along at least a portion of the channel to interact with capture agents of the slide, and/or a plurality of passages is included to connect the at least one input to the at least one output via the plurality of channels of the channel membrane so as to establish a serpentine, serial channel. The plurality of passages include:

a first passage connecting the at least one input to an end of the first channel of the channel membrane, a second passage connecting the at least one output to an end of the last channel of the channel membrane, and a plurality of third passages each for connecting every other adjacent end of adjacent channels such that the serpentine channel is established from the at least one input, serially through each channel to the at least one output.

In some embodiments, a multiplex assay system configured for multiplexed analysis of biological material is provided and includes a receiving area configured to receiving a plurality of multiplex assay devices (MADs) according to any of the disclosed MAD/device embodiments (e.g., see above), a fluorescing device configured to expose the capture agent slide and corresponding channels of the channel membrane to the fluorescing light, and an imager configured to image the capture agent slide and corresponding channels of the channel membrane upon the capture agent slide and channels being exposed to the fluorescing light.

Such embodiments may include one and/or another (in some embodiments, a plurality of, in further embodiments, a majority of, and in further embodiments, all of) of the following steps, features, clarifications, structures, objectives, advantages, or functionality (as applicable), yielding yet further embodiments:

a graphical user interface (GUI), where the GUI can be configured to at least one of display information and/or output from the system, and receive input from a user;

an electronic reader which can be configured to receive or otherwise obtain a code from each of the MADs;

one or more processors configured with computer instructions operational thereon to cause the system to perform a plurality of steps of a method where the method comprises at least a plurality of:

identifying each MAD via reading of a code of a respective MAD;

confirming proper application of sealing membrane over the first openings of each MAD;

incubating each MAD over a period of time, such that, one or more components of the biological samples loaded into the plurality of first openings bind to capture agents contained on the capture (CA) slide;

flowing one or more reagents through the serpentine channel;

activating the fluorescing device;

imaging the capture agent (CA) slide from the opening in the second frame upon exposure of the CA slide to the fluorescing light; and generating one or more graphs, charts, and/or information based on the acquired image.

In some embodiments, a multiplex assay system configured for multiplexed analysis of biological material is provided and includes a receiving area configured to receiving a plurality of multiplex assay devices (MADs) according to any such disclosed embodiments thereof, a graphical user interface configured to both display information and/or output from the system and receive input from a user, a fluorescing device configured to expose the opening of a second frame of each MAD to fluorescing light, an imager configured to image the capture agent (CA) slide and corresponding channels of the channel membrane upon the CA slide being exposed to the fluorescing light, an electronic reader configured to receive or otherwise obtain a code from each of the MADs, and one or more processors configured with computer instructions operational thereon to cause the system to perform the method comprising identifying each MAD via reading of a code of a respective MAD, confirming proper application of sealing membrane over the first openings of each MAD, incubating each MAD over a period of time, such that, one or more components of the biological samples loaded into the plurality of first openings bind to capture agents contained on the CA slide, flowing one or more reagents through the serpentine channel, activating the fluorescing device, imaging the CA slide from the opening in the second frame upon exposure of the CA slide to the fluorescing light, and generating one or more graphs, charts, and/or information based on the acquired image.

In some embodiments, a multiplex assay method for multiplexed analysis of biological material is provided and includes loading one or more biological samples into one or more of a plurality of first openings of the multiplex assay device (MAD), according to any of the disclosed embodiments thereof, and processing the one or more MADs via a processing system according to any system embodiment disclosed herein.

Such embodiments may include one and/or another (in some embodiments, a plurality of, in further embodiments, a majority of, and in further embodiments, all of) of the following steps, features, clarifications, structures, objectives, advantages, or functionality (as applicable), yielding yet further embodiments:

- prior to processing, loading the one or more MADs into the processing system;
- incubating the MAD over a period of time, where the period of time is sufficient such that, one or more components of the biological samples loaded into one and/or another of the plurality of first openings bind to capture agents contained on the CA slide;
- flowing one or more reagents through the serpentine channel;
- exposing at least one of the CA slide and channels of the channel membrane to fluorescing light;
- capturing an image of at least one of the capture agent (CA) slide and channels of the channel membrane upon exposure of the CA slide to the fluorescing light;
- prior to processing, at least one of:
  - loading background buffer medium into respective BOs of each row, and covering the first openings with a sealing membrane;
  - identifying, via the processing system, the MAD via reading of a code of the MAD; and
  - generating one or more graphs, charts, and/or information based on the captured image;
- and
- capturing the imaging of at least one of the CA slide and channels of the channel membrane of each MAD is via an opening in a frame of the MAD.

In some embodiments, a multiplex assay method for multiplexed analysis of biological material and includes loading one or more biological samples into one or more of a plurality of first openings of the multiplex assay device (MAD) of any of the disclosed embodiments thereof, loading background buffer medium into a respective BO of each row of the plurality of first openings, covering the first openings with a sealing membrane, placing the MAD within a processing system, identifying, via the processing system, the MAD via reading of a code of the MAD, confirming proper application of sealing membrane over the first openings, incubating the MAD over a period of time, such that, one or more components of the biological samples loaded into the plurality of first openings bind to capture agents contained on the capture agent (CA) slide, flowing one or more reagents through the serpentine channel, capturing an imaging of at least one of the CA slide and channels of the channel membrane via an opening in the MAD upon exposure of the CA slide to fluorescing light, and generating one or more graphs, charts, and/or information based on the acquired image.

These and other embodiments will become even more apparent with reference to the detailed description which follows, as well any associated figures corresponding thereto, a brief description of which is set out below.

FURTHER DETAILS OF AT LEAST SOME EMBODIMENTS

Figure 1:
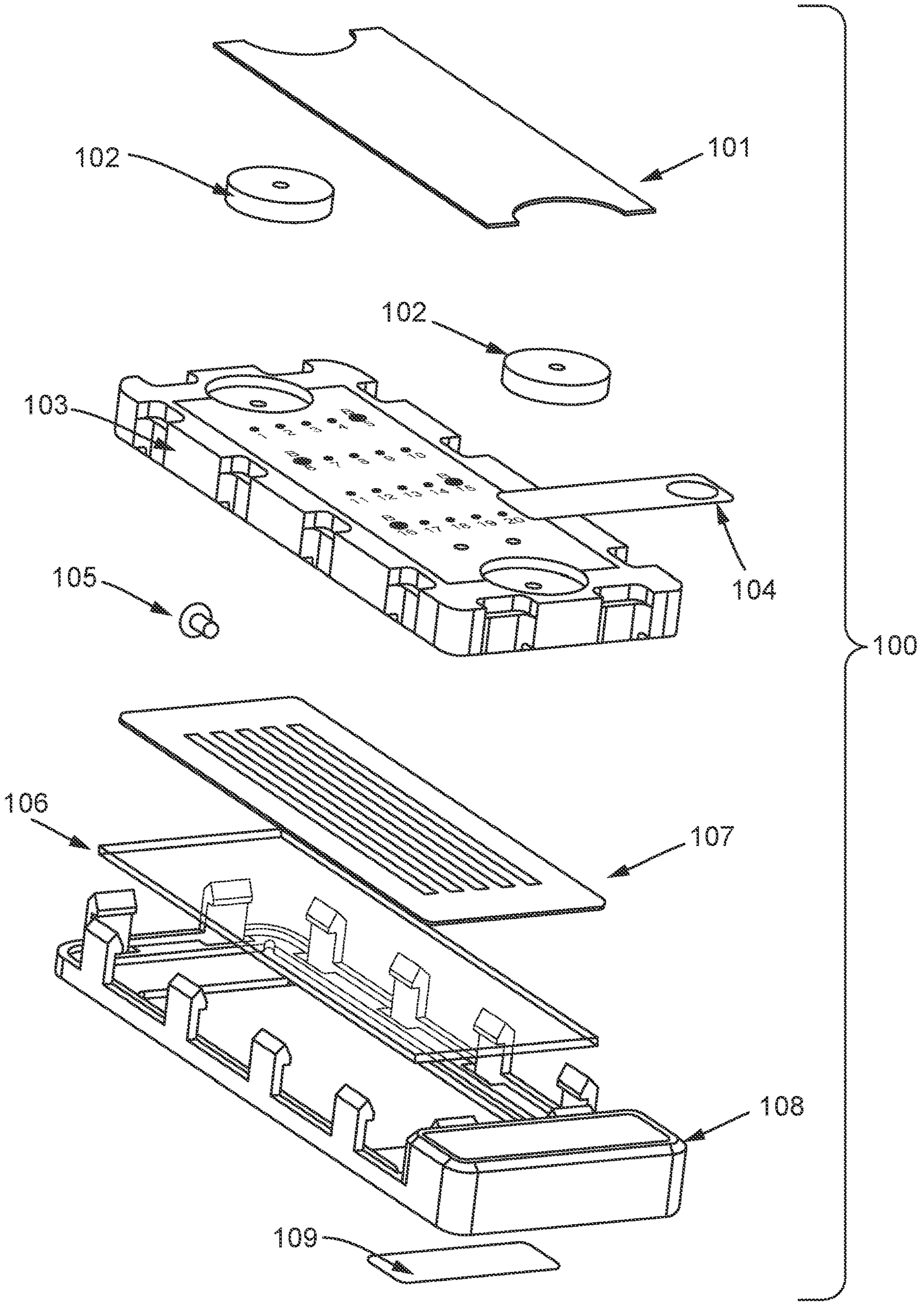
FIG. 1 is an expanded view of a multiplex assay device (MAD) according to some embodiments of the disclosure.

FIG. 1 is an expanded view of a multiplex assay device (MAD) 100, according to some embodiments of the disclosure. As shown, the MAD comprises a first frame 103, a second frame 108, a capture agent slide 106, a channel membrane 107, at least one flexible seal 102, a coded label 109, and a cover membrane 101.

In some embodiments of a MAD configured for at least one of multiplexed analysis of biological material and a cell suspension, a single cell, cells or a cell suspension can be stimulated directly on the MAD after loading. In some embodiments, the single cell, cells, or cell suspension can be stimulated by soluble or surface bound stimulants.

Figure 2:
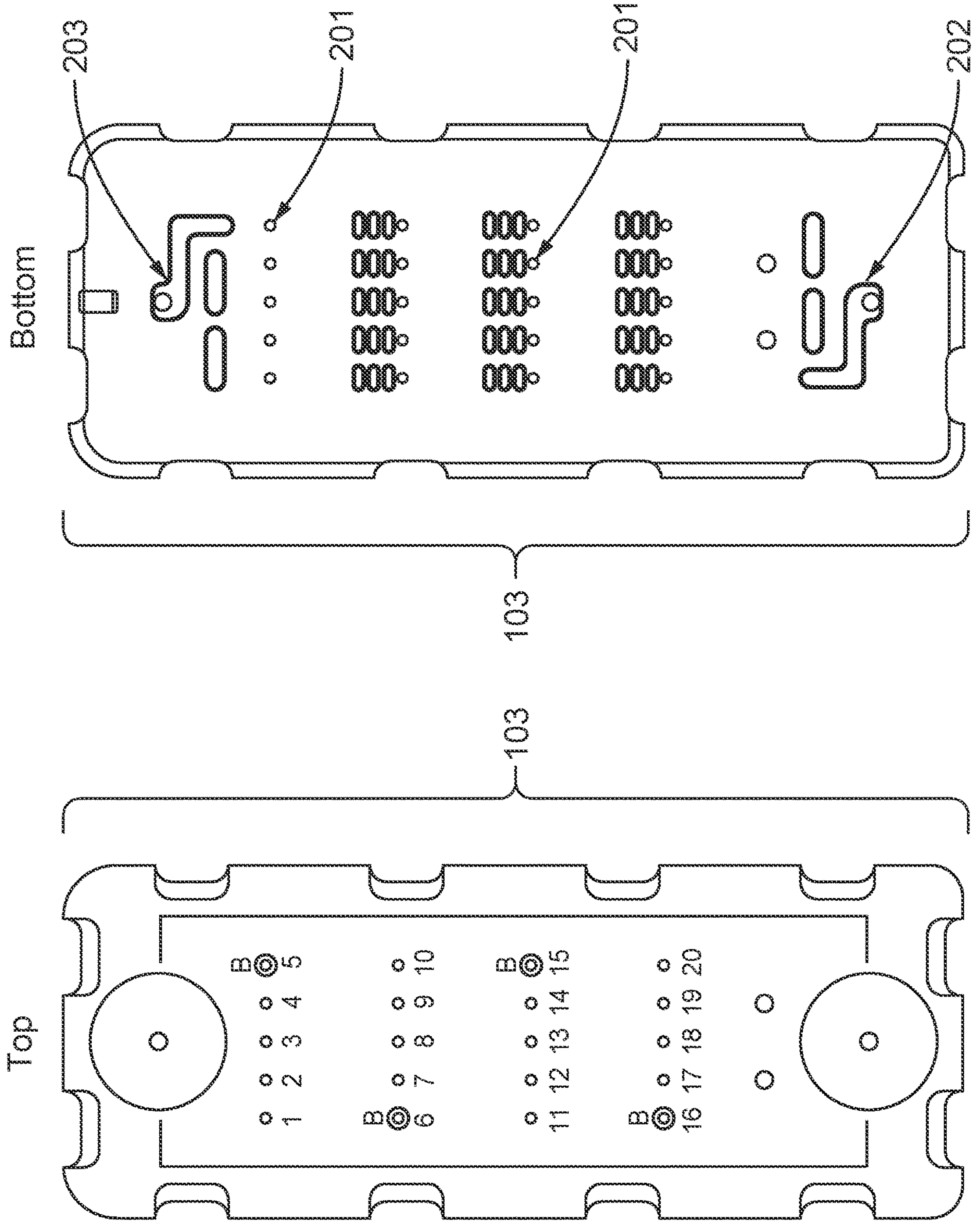
FIG. 2 is a top and bottom view of a first frame including a plurality of first openings for the MAD, according to some embodiments of the disclosure.
Figure 11:
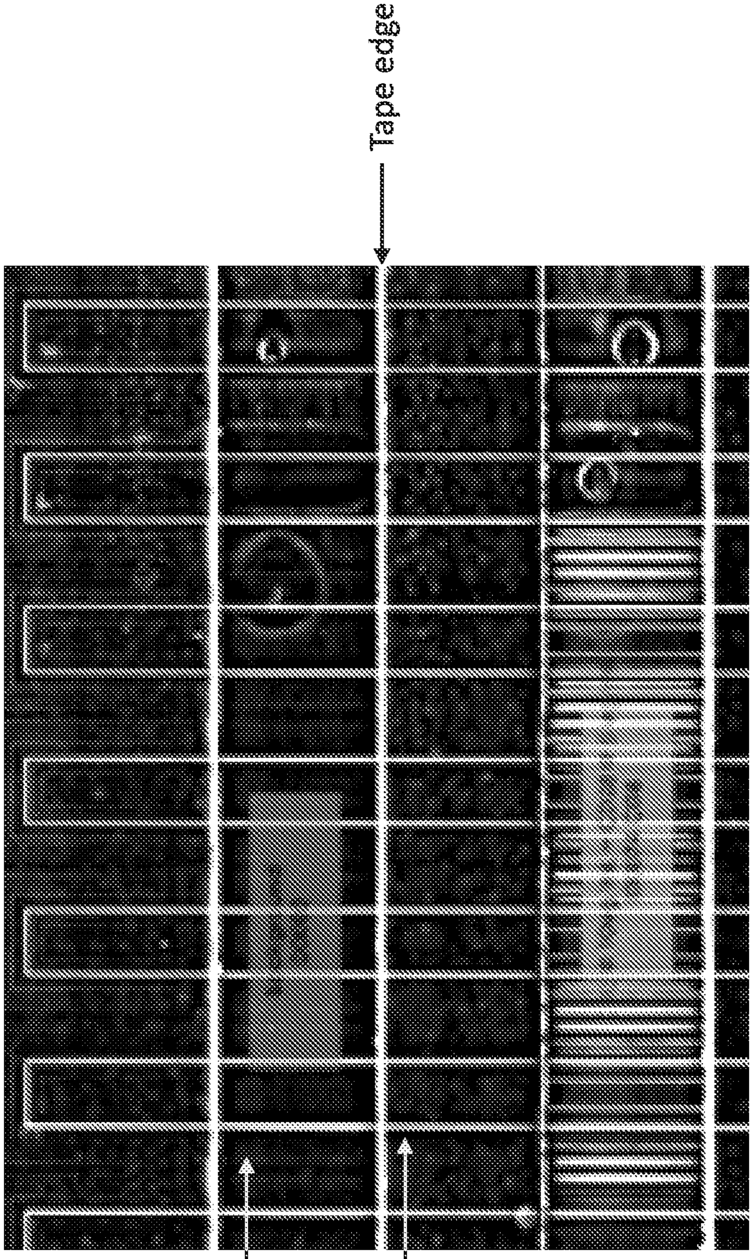
FIG. 11 is am image depicting low background emanating from the top of a first frame of a MAD and low background/autoflourescence emanating from a cover membrane of a MAD, all according to some embodiments of the present disclosure.

FIG. 2 depicts top and bottom views of the first frame 103 comprising a plurality of first openings 201, an input opening 202, and an output opening 203. In some embodiments, the first frame can comprise polydimethylsiloxanes (PDMS) and/or aluminum. In some embodiments, a first frame comprising aluminum produces low background autofluorescence and/or fluorescence (FIG. 11). In some embodiments, the aluminum is anodized aluminum.

In some embodiments, the first frame comprises 1 to 1,000 openings. In some embodiments, the first frame comprises 5, 10, 15, 20, 25, 30, 35, 40, 45, 50, 100, 120, 140, 160, 180, 200, 300, 400, 500, 600, 700, 800, 900, or 1,000 openings or any number in between of openings. In some embodiments, the first frame comprises 20 openings.

In some embodiments, the first frame comprises 1 to 1,000 first openings. In some embodiments, the first frame comprises 5, 10, 15, 20, 25, 30, 35, 40, 45, 50, 100, 120, 140, 160, 180, 200, 300, 400, 500, 600, 700, 800, 900, or 1,000 openings or any number in between of first openings. In some embodiments, the first frame comprises 20 first openings.

Figure 3:
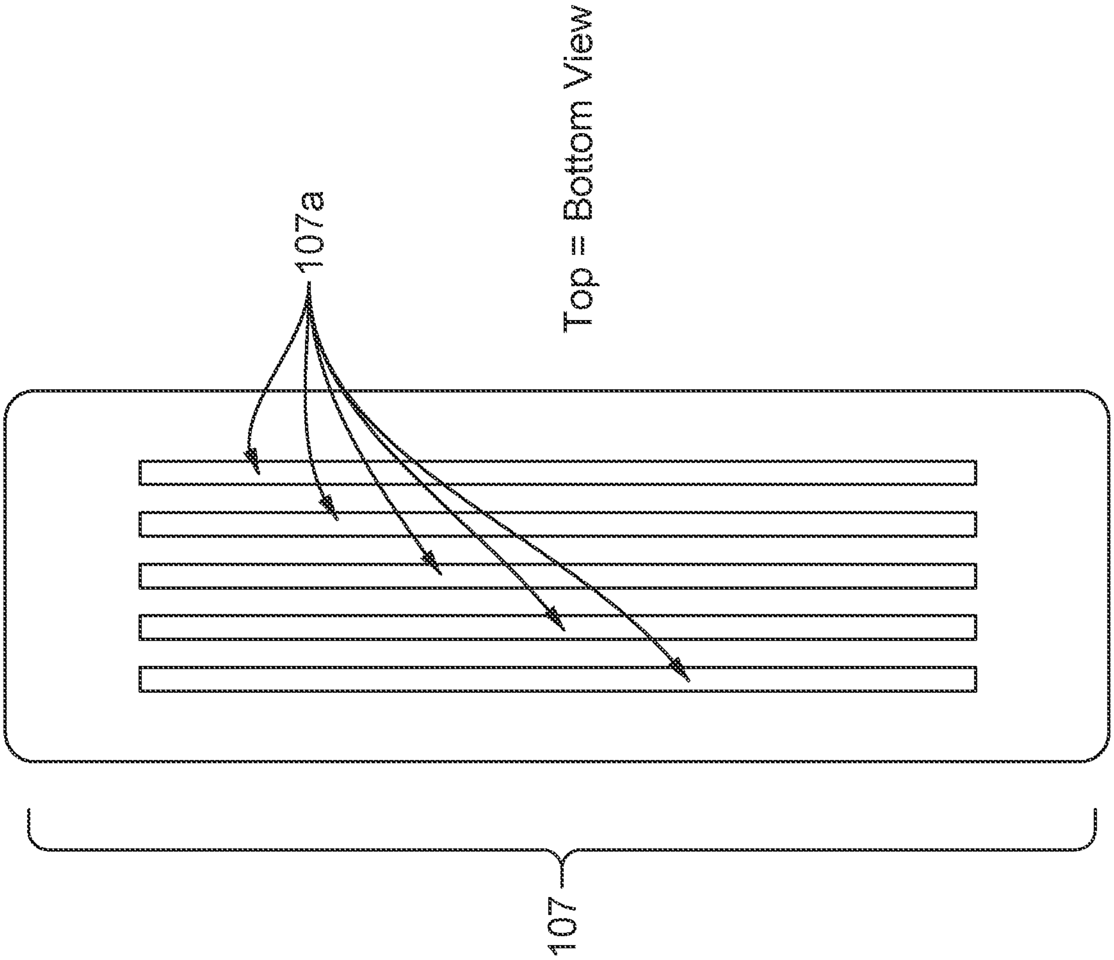
FIG. 3 is a view of a channel membrane for a MAD according to some embodiments of the disclosure.

FIG. 3 depicts a channel membrane 107, according to some embodiments, for use with a MAD. In some embodiments, the channel membrane is configured with a plurality of elongated slots 107*a* configured as channels, where each channel can extend substantially from a first end of the channel membrane to a second end of the channel membrane. The channels include a first channel (e.g., the left most channel), and a last channel (e.g., the right most channel). In some embodiments, the channel membrane includes a first side for positioning adjacent the first frame, and a second side to overlay the CA slide such that capture agents contained on the slide are within each channel of the plurality of channels.

Figure 4:
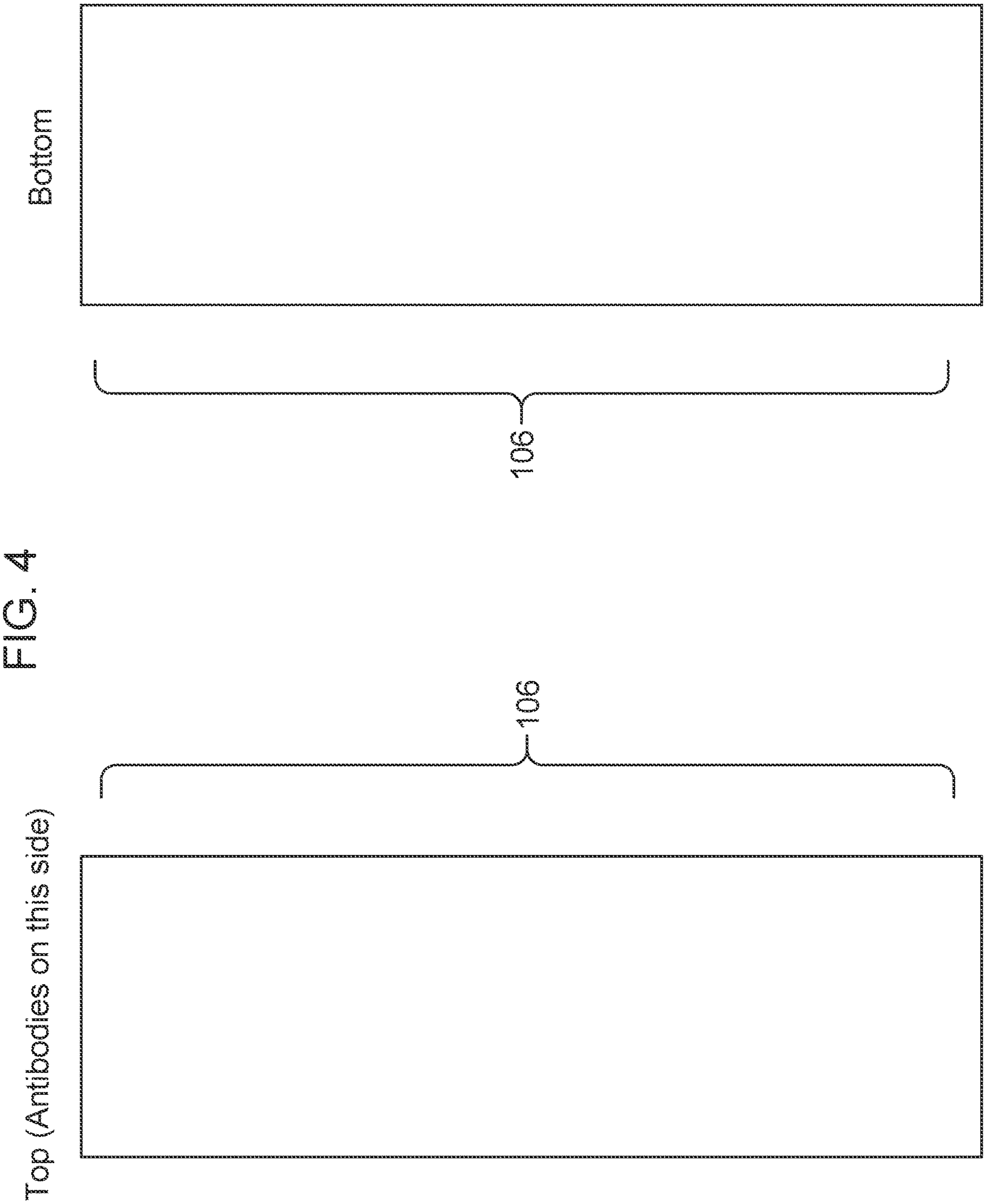
FIG. 4 is a top and bottom view of a capture agent slide for a MAD according to some embodiments of the disclosure.

FIG. 4 is a top and bottom view of capture agent slides 106, according to some embodiments, for use with a MAD. In some embodiments, capture agent (CA) slides, comprise a plurality of immobilized capture agents, each immobilized capture agent capable of specifically binding to one of the plurality of cellular components. Preferably:

- the immobilized capture agents are arranged in uniform capture agent slides; and/or
- the immobilized capture agents are attached to a surface in a repeatable pattern, where each repeat of the pattern can align with a channel of the plurality of channels.

The array and capture agent slides can be coupled to form a plurality of enclosed volumes (see above), each enclosed volume can be referred to or otherwise comprise a chamber, such that the contents of each chamber can be accessible to each and every capture agent of the capture agent slides. In some embodiments, the repeatable pattern is a serpentine-like pattern (e.g., following connected channels).

Preferred capture agents include antibodies, however, capture agents may include any detectable entity that specifically binds to a cellular component of the disclosure. In some embodiments, the cellular component is a protein, nucleic acid, or metabolite. The detectable entity may comprise a detectable label, for example. Detectable labels may include, but are not limited to fluorescent labels.

In some embodiments, the capture agent slides may comprise between 3 and 50 different capture agents, thereby allowing for the detection of between 3 and 50 different cellular components (for example), but may include greater than 10 different capture agents, thereby allowing for the detection of greater than 10 different cellular components, or may comprise greater than 42 different capture agents, thereby allowing for the detection of greater than 42 different cellular components, or may comprise greater than 50, 100, 150, 200, 250, 300, 350, 400, 450, 500 or any number in between of different capture agents, thereby allowing for the detection of greater than 50, 100, 150, 200, 250, 300, 350, 400, 450, 500 or any number in between of different cellular components.

In some embodiments, the capture agents are antibodies. In some embodiments, the capture agents are specific to cytokines and components of or stimulators of the immune system. In some embodiments of this use, the effector cytokines are selected from the group consisting of CCL-11, GM-CSF, Gran B, IFN-g, IL-10, IL-12, IL-13, IL-15, IL-17A, IL-17F, IL-1b, IL-2, IL-21, IL-22, IL-4, IL-5, IL-6, IL-7, IL-8, IL-19, IP-10, MCP-1, MCP-4, MIP-1alpha, MIP-1beta, perforin, RANTES, TGFbeta1, TNF-alpha, TNF-beta, sCD137, and sCD40L.

In some embodiments, the capture agents are proteins. In some embodiments, the protein capture agents are configured to capture antibodies present in the biological sample.

Figure 5:
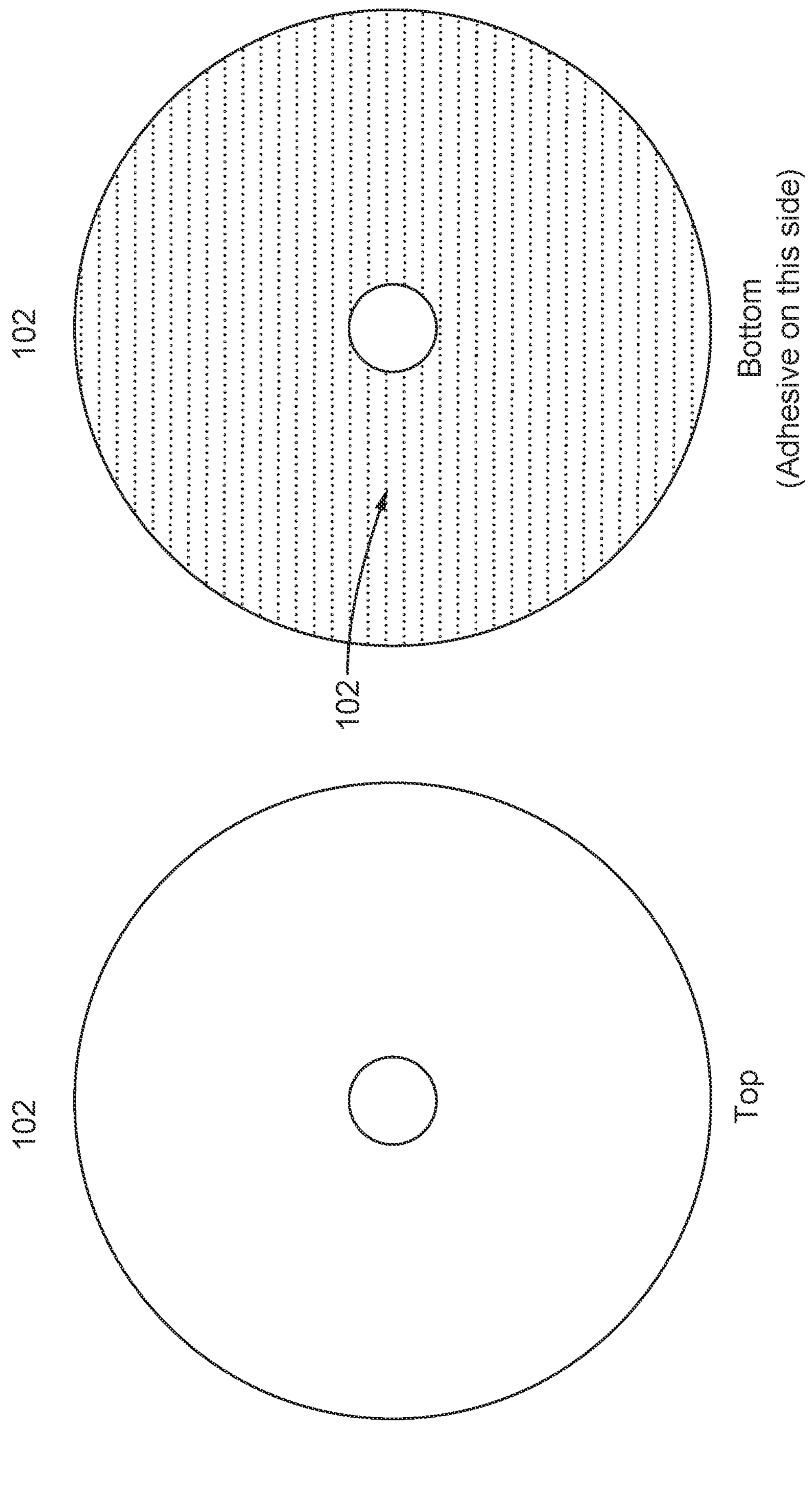
FIG. 5 is a top and bottom view of a flexible seal for a MAD according to some embodiments of the disclosure.

FIG. 5 is a top and bottom view of the flexible seal 102 for use in a MAD according to some embodiments of the disclosure. In some embodiments, the MAD includes at least one flexible seal, which may be provided for the at least one input opening. In some embodiments, the flexible seal has adhesive 501 on one side of the seal. In some embodiments of the MAD, a pair of flexible seals is provided, one each for sealing the at least one input opening and the at least one output opening. In some embodiments, a respective opening or recess for receiving a respective flexible seal is provided in one and/or another of the frames (or other components). In some embodiments, a first flexible seal is provided at a first end of the first frame, and a second flexible seal is provided at a second, opposite end of the first frame.

Figure 6:
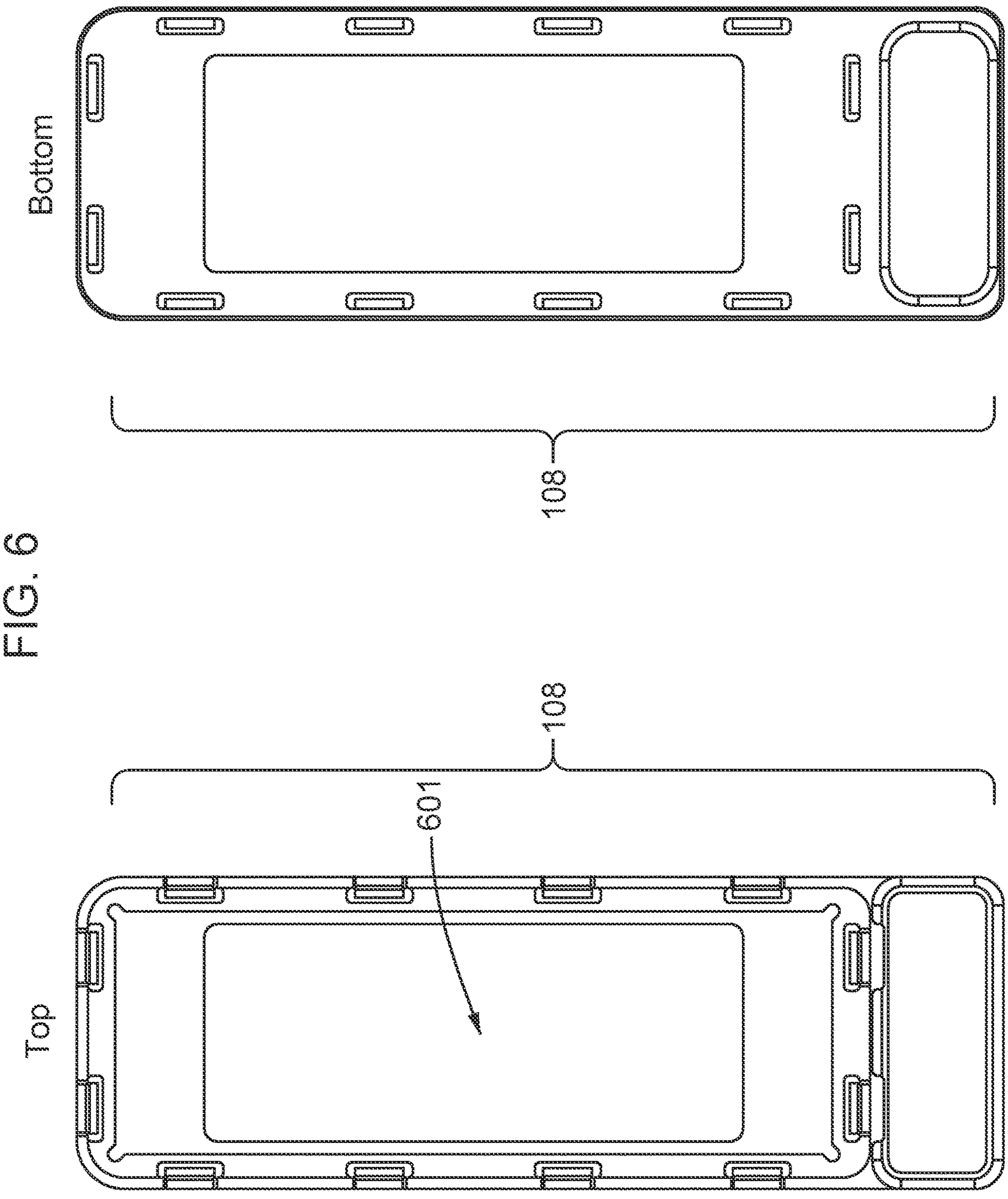
FIG. 6 is a top and bottom view of a second frame for a MAD according to some embodiments of the disclosure.

FIG. 6 is a top and bottom view of the second frame 108 for a MAD according to some embodiments of the disclosure. In some embodiments, a coded label 109 (see FIG. 7) is provided on the MAD (e.g., a portion of the frame) for identifying the MAD. In some embodiments, the second frame includes an opening 601 so as to image the side of the CA slide and channels established by the channel membrane facing thereto. In some embodiments, each channel of the channel membrane being positioned below at least one first opening of each row of first openings, such that a sample loaded into a respective first opening proliferates along at least a portion of the channel to interact with capture agents of the slide.

Figure 7:
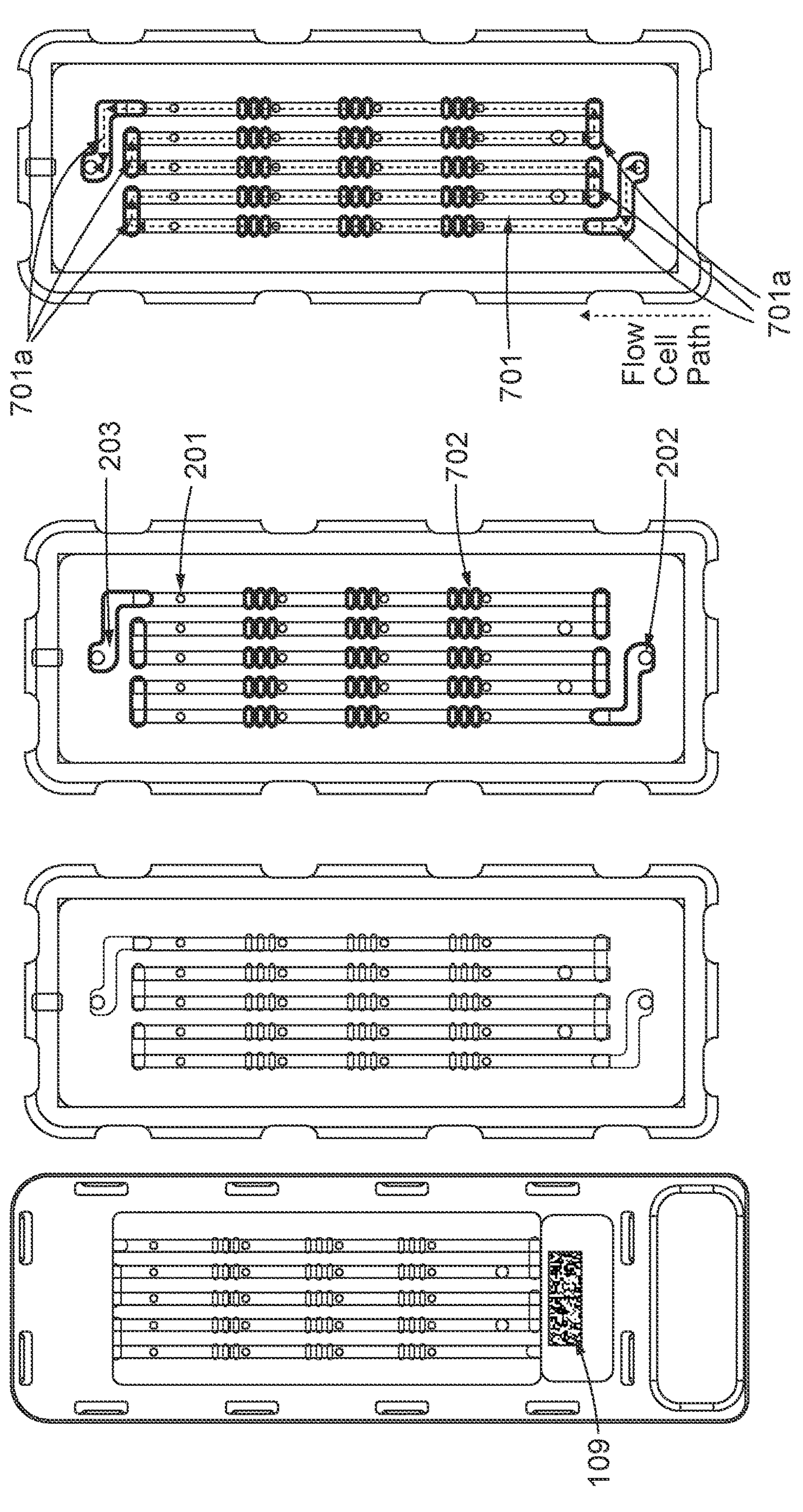
FIG. 7 is a series of views of a MAD, according to some embodiments of the disclosure, depicting a flow path of liquid through the device.

FIG. 7 depicts a MAD 100, according to some embodiments, configured for multiplexed analysis of biological material is provided. As shown, the MAD includes a first frame 103 including a plurality of first openings 201 arranged in a plurality of rows, a plurality of capillary stops 702 arranged adjacent each of the plurality of first openings configured to prevent cross-contamination between at least one first opening of a first row of the plurality of rows and at least one first opening of a second row of the plurality of rows adjacent the first row, at least one input opening 202 arranged on a first end of the first frame and extending from the first side of the first frame to the second side of the first frame and configured for receiving a flow, and at least one output opening 203 arranged on a second end of the frame opposite the first end and extending from the first side of the frame to the second side of the frame and configured for exhausting the flow. The MAD may also include a first membrane 101 configured to cover the plurality of first openings after a biological material sample has been pipetted into at least one of the first openings, a capture agent (CA) slide 106, and a channel membrane 107 configured with a plurality of elongated slots configured as channels, where each extends substantially from a first end of the channel membrane to a second end of the channel membrane. The channels can include a first channel and a last channel (e.g., left most/right most), with a first side for positioning adjacent the first frame, and a second side to overlay the CA slide such that capture agents contained on the slide are within each channel of the plurality of channels. The MAD may further include a second frame, a pair of flexible seals 102, one each provided for the at least one input opening and the at least one output opening, at a first end and a second end, respectively, of the assembly adjacent or within a recess of the second housing or frame. The MAD may further yet include a coded label 109 for identifying the MAD.

In some embodiments, this biological sample is a plurality of cells, a single cell, a cell lysate, or a plurality of proteins, peptides, metabolites and/or nucleic acids. In some embodiments, the plurality of proteins, peptides, metabolites and/or nucleic acids are derived from the plurality of cells, the single cell, or the cell lysate. In some embodiments, the metabolite is a small molecule. In some embodiments, the metabolite is glucose, glutamine, or lactate.

In some embodiments, the nucleic acid is DNA or RNA. In some embodiments, the DNA is autosomal DNA, chromosomal DNA, cDNA, exosome DNA, single stranded DNA, or double stranded DNA. In some embodiments, the RNA is mRNA, rRNA, tRNA, snRNA, regulatory RNA, microRNA, exosome RNA, or double stranded RNA. In some embodiments, the RNA is an mRNA. In some embodiments, the RNA is a guide RNA from a CRISPR-Cas system.

In some embodiments, the single cell is an immune cell. In some embodiments, the plurality of cells is a homogenous cell population comprising a single cell type. In some embodiments, the plurality of cells is a heterogeneous cell population comprising more than one cell type.

In some embodiments, the single cell immune cell is a T-lymphocyte, a B-lymphocyte, a natural killer (NK) cell, a macrophage, a neutrophil, a mast cell, an eosinophil, or a basophil. In certain embodiments, the T-lymphocyte comprises a nai:ve T-lymphocyte, an activated T-lymphocyte, an effector T-lymphocyte, a helper T-lymphocyte, a cytotoxic T-lymphocyte, a gamma-delta T-lymphocyte, a regulatory T-lymphocyte, a memory T-lymphocyte, or a memory stem T-lymphocyte. In some embodiments, the T-lymphocyte expresses a non-naturally occurring antigen receptor. In certain embodiments, the T-lymphocyte expresses a Chimeric Antigen Receptor (CAR).

In some embodiments, the heterogeneous cell population comprises one or more immune cells, where the one or more immune cells can comprise a T-lymphocyte, a B-lymphocyte, a natural killer (NK) cell, a macrophage, a neutrophil, a mast cell, an eosinophil, or a basophil. In certain embodiments, the T-lymphocyte comprises a nai:ve T-lymphocyte, an activated T-lymphocyte, an effector T-lymphocyte, a helper T-lymphocyte, a cytotoxic T-lymphocyte, a gamma-delta T-lymphocyte, a regulatory T-lymphocyte, a memory T-lymphocyte, or a memory stem T-lymphocyte. In some embodiments, the T-lymphocyte expresses a non-naturally occurring antigen receptor. In certain embodiments, the T-lymphocyte expresses a Chimeric Antigen Receptor (CAR).

In some embodiments, the heterogeneous cell population comprises one or more immune cells, where the one or more immune cells can comprise a T-lymphocyte, a B-lymphocyte, a natural killer (NK) cell, a macrophage, a neutrophil, a mast cell, an eosinophil, or a basophil. In some embodiments, the B-lymphocyte comprises a plasmablast, a plasma cell, a memory B-lymphocyte, a regulatory B cell, a follicular B cell, or a marginal zone B cell.

Figure 8B:
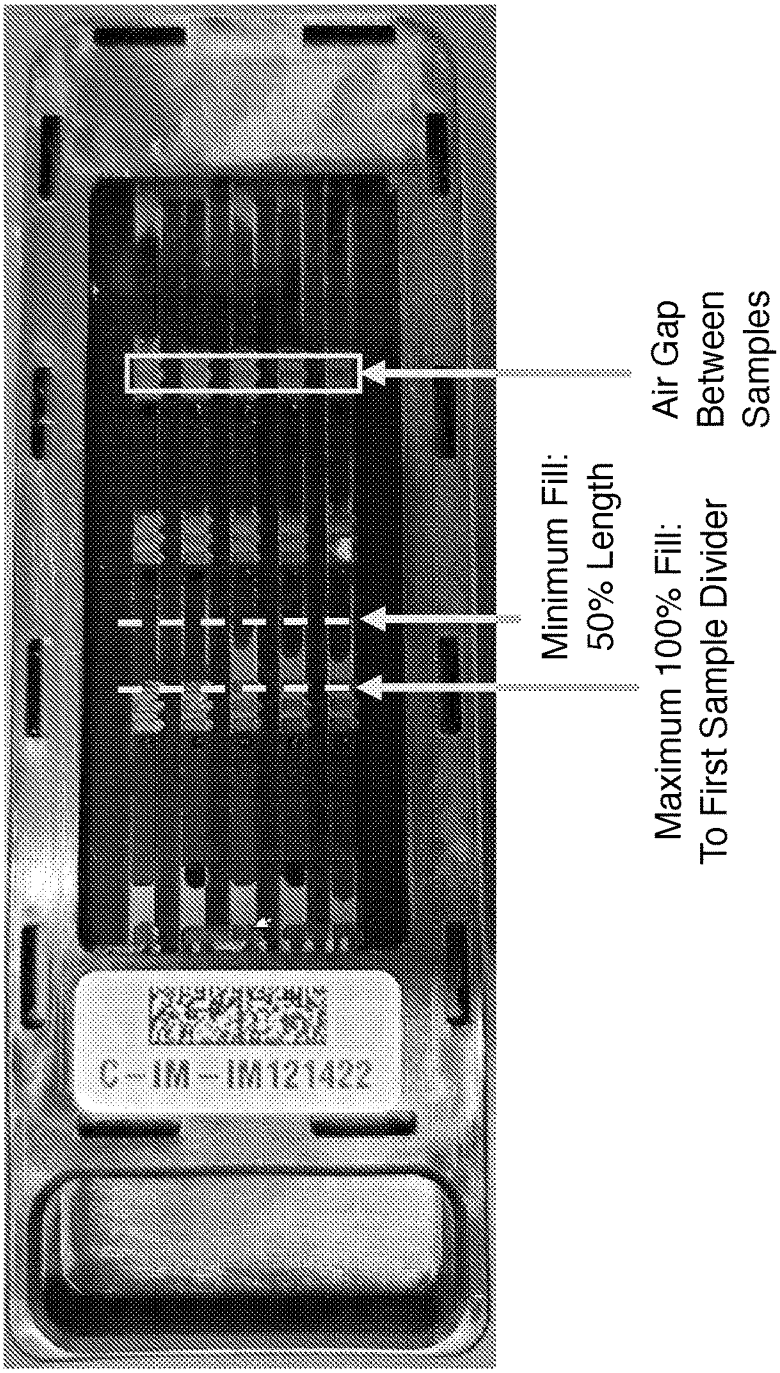
FIG. 8B is a photograph depicting sample filling in openings of a MAD according to some embodiments of the disclosure, as well as depicting one or more capillary stops configured for isolating an opening from an adjacent an opening for preventing sample cross-contamination (according to some embodiments of the disclosure).
Figure 8A:
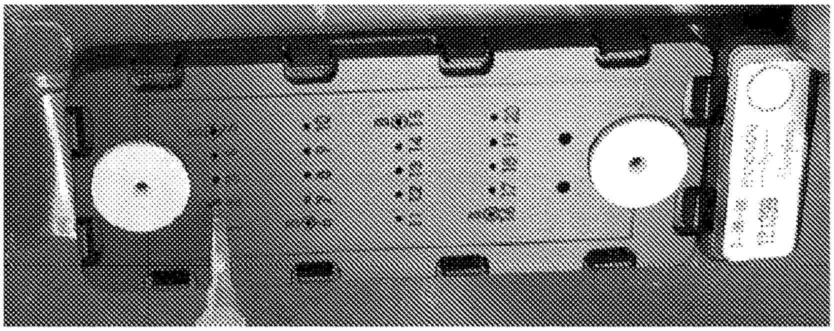
FIG. 8A is a photograph showing an assembled MAD according to some embodiments of the disclosure.
Figure 8D:
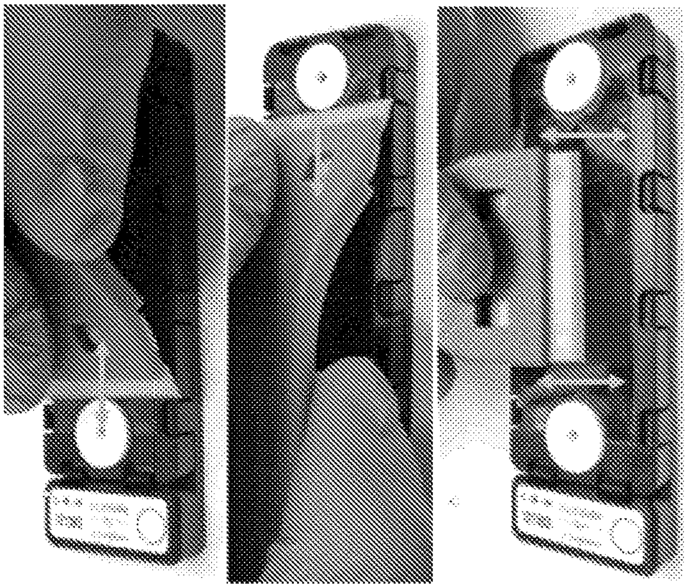
FIG. 8D is a photograph depicting sealing a MAD with a cover membrane using a sealing device according to some embodiments of the present disclosure.
Figure 8C:
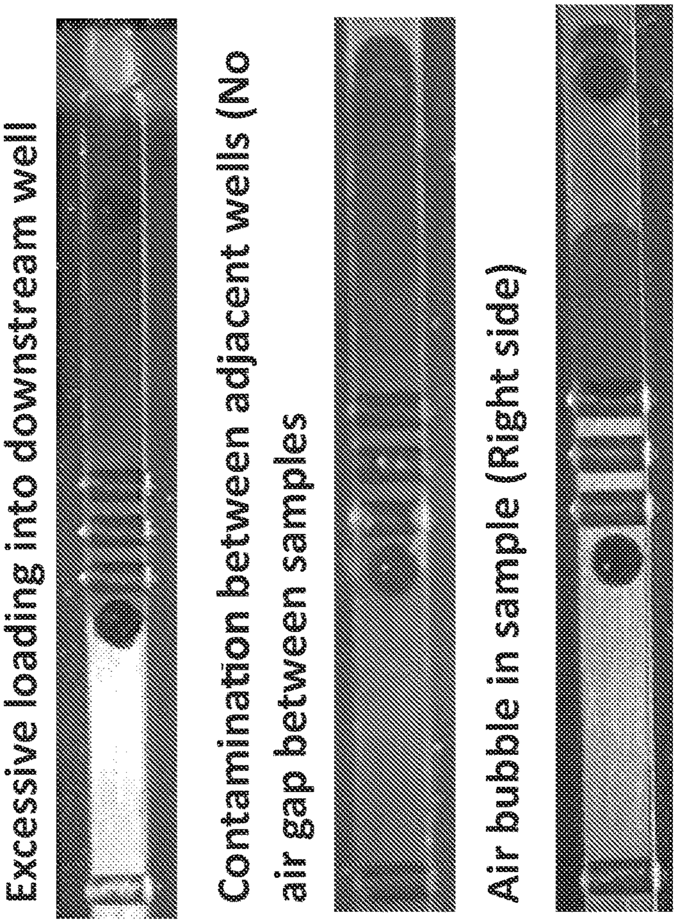
FIG. 8C is a series of photographs depicting errors in sample loading of a MAD according to some embodiments of the present disclosure.

FIG. 8A is a photograph showing an assembled MAD according to some embodiments of the disclosure, and FIG. 8B is a photograph depicting sample filling in openings of a MAD according to some embodiments of the disclosure, as well as depicting one or more capillary stops configured for isolating an opening from an adjacent an opening for preventing sample cross-contamination (according to some embodiments of the disclosure). FIG. 8C is a series of photographs depicting errors in sample loading of a MAD according to some embodiments of the present disclosure, and FIG. 8D is a photograph depicting sealing a MAD with a cover membrane using a sealing device according to some embodiments of the present disclosure.

Figure 8E:
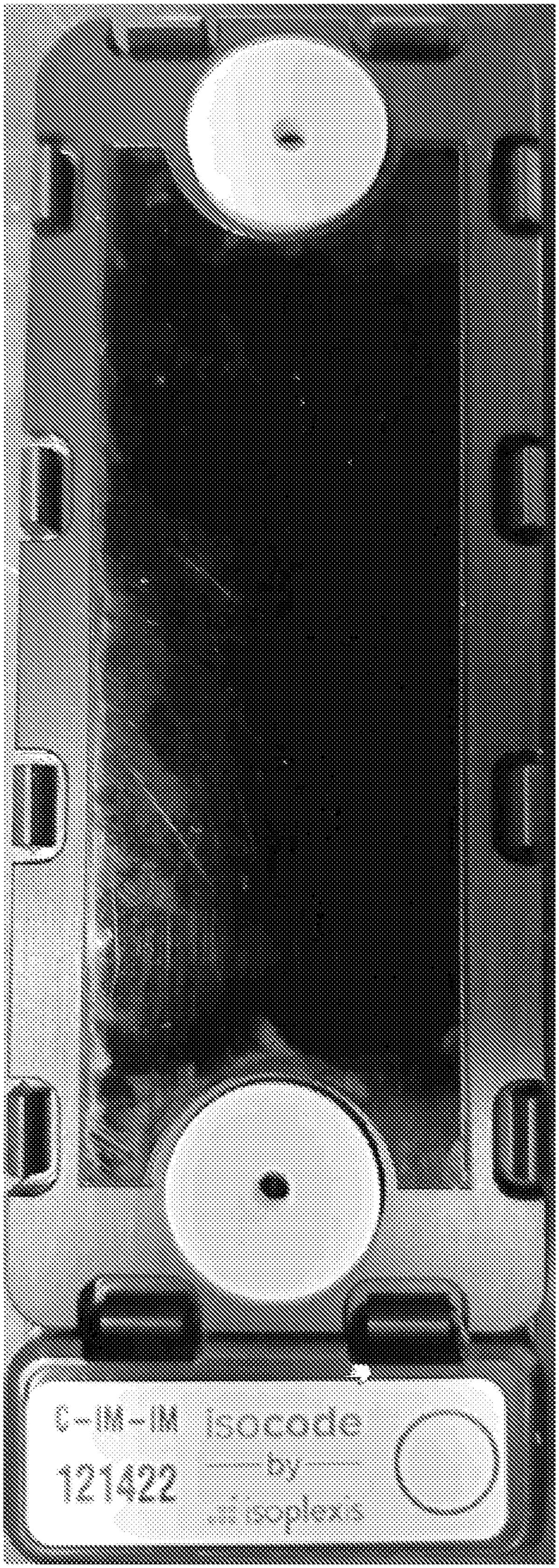
FIG. 8E is a photograph of a properly sealed MAD according to some embodiments of the present disclosure.

FIG. 8E depicts the cover membrane 101 applied to the top of the first frame 103. In some embodiments, the cover membrane is a transparent polypropylene film comprising a silicone adhesive on both sides of the film. In some embodiments, cover membranes include at least one of low autofluorescence, compatibility with biological samples and reagents, low outgassing, an operating range of at least between −20° C. to 40° C., and a total thickness between 20 μm and 600 μm. In some embodiments the total thickness of the carrier membrane is between 50 μM and 250 μm.

In some embodiments of the MAD, each first opening extends from a first side of the first frame to a second side of the first frame, and at least one of the first openings in each row can correspond to a designated background opening (BO) for receiving background medium. In some embodiments, the background medium is a cell culture medium. In some embodiments, the background medium contains no cellular or biological components. In some embodiments, the cell culture medium is RPMI, RPMI-1640, DMEM, MEM, or PBS.

In some embodiments of the MAD, at least one capillary stop 702 is provided (FIG. 7) arranged adjacent at least one of the plurality of first openings. The at least one capillary stop, in some embodiments, is arranged adjacent at least one of the plurality of first openings, where the at least one capillary stop is configured to prevent cross-contamination between adjacent first openings. Capillary stops of the disclosure form reservoirs for excess sample to collect if an excess of samples is applied to one of the plurality of first openings.

Figure 9A:
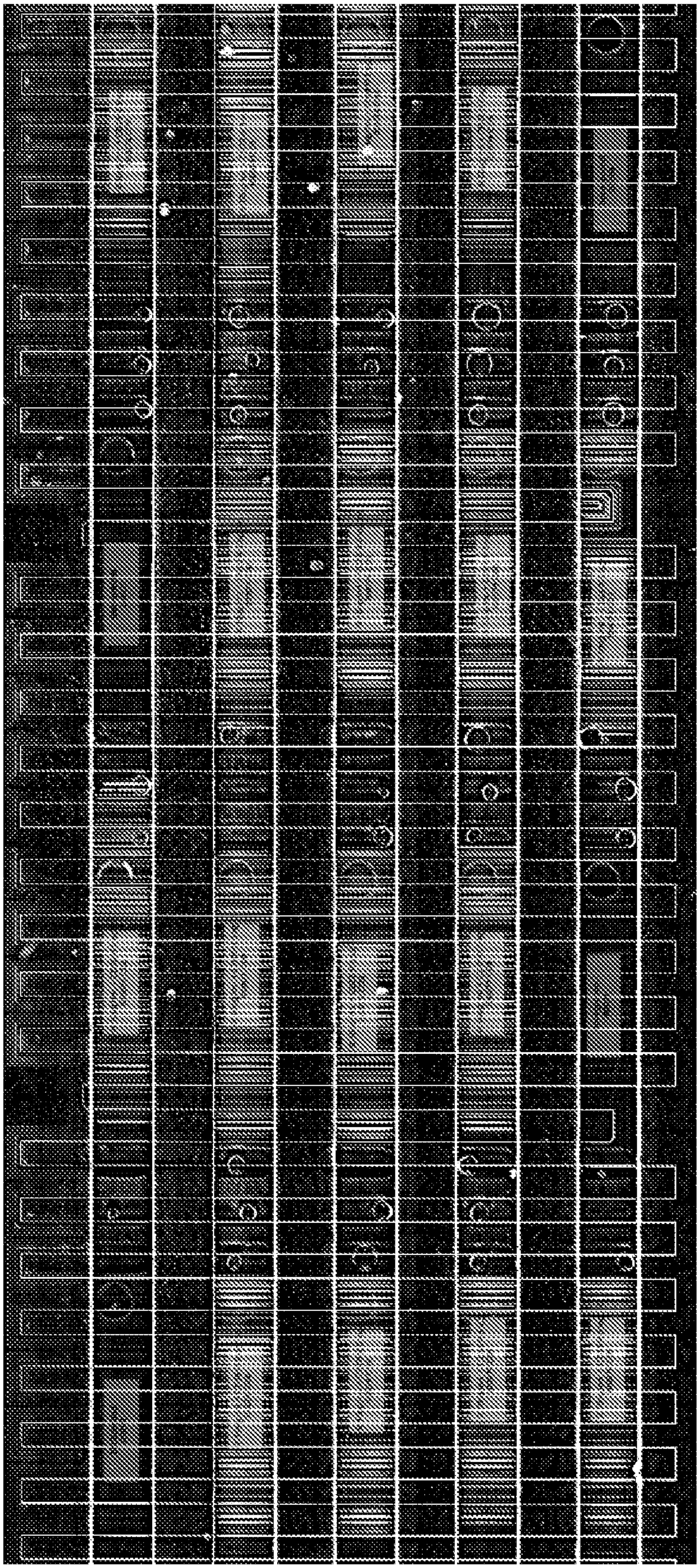
FIG. 9A is an image depicting the capture agent (CA) slide from the first opening in the second frame upon exposure of the CA slide to fluorescing light, according to some embodiments.
Figure 10:
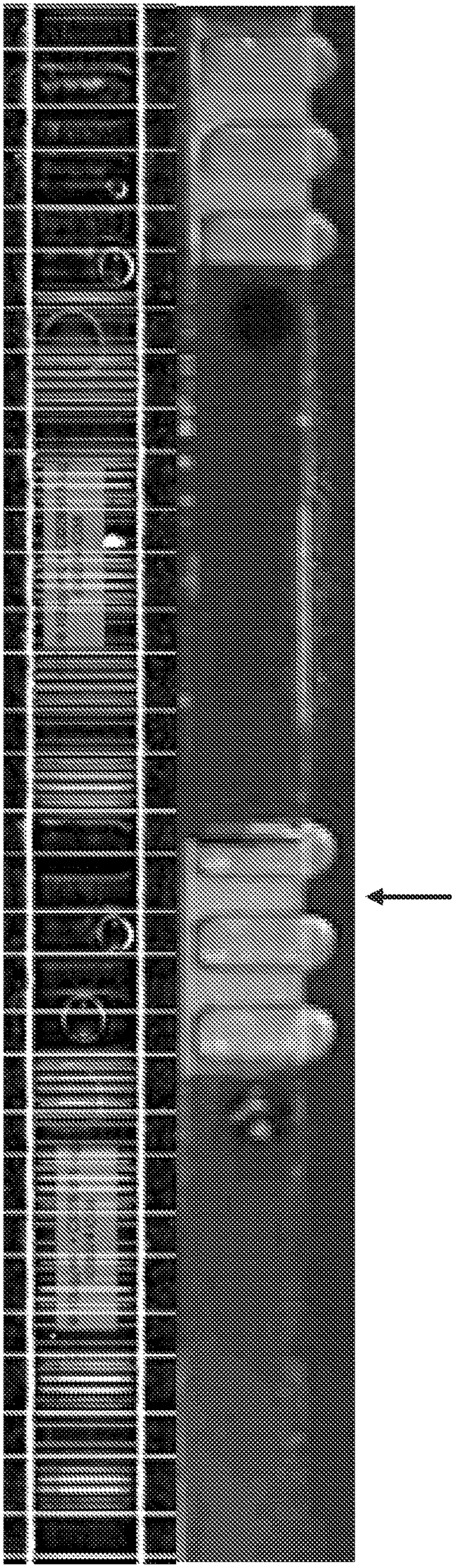
FIG. 10 is an alignment of a fluorescent image and light field image depicting the sample isolation created by the capillary stops between adjacent first openings of a MAD, according to some embodiments.

FIG. 9A is a fluorescent image of a MAD of the disclosure depicting capture agents that have detected analytes (e.g., via fluorescing) in the biological samples applied to each of the plurality of first openings. FIG. 9A also depicts areas where no detection has occurred (e.g., corresponding to a location of a capillary stop). FIG. 10 is an alignment of a fluorescent and light field image demonstrating that the capillary stops prevents sample cross-contamination.

In some embodiments, the MAD of the disclosure can be moved in horizontal and vertical orientations, inverted or tapped without inducing sample cross-contamination.

In some embodiments of the MAD, the sample volume applied to the plurality of first openings 201 and subsequently to the plurality of channels is between 10 nL and 100 μL. In some embodiments, the sample volume is 0.5 μL, 1 μL, 2 μL, 3 μL, 4 μL, 5 μL, 5.5 μL, 6 μL, 7 μL, 8 μL, 9 μL, or 10 μL. In some embodiments, the volume of sample in contact with the capture agent slide is 0.1 μL, 0.2 μL, 0.3 μL, 0.4 μL, 0.5 μL, 0.6 μL, 0.7 μL, 0.8 μL, 0.9 μL, 1 μL, 1.5 μL, 2 μL, or 3 μL.

In some embodiments of the MAD, the first frame includes a plurality of passages 701*a* connecting the at least one input to the at least one output via the plurality of channels of the channel membrane so as to establish a serpentine, serial channel 701. In some embodiments, the plurality of passages include a first passage connecting the at least one input to an end of the first channel of the channel membrane.

Figure 12:
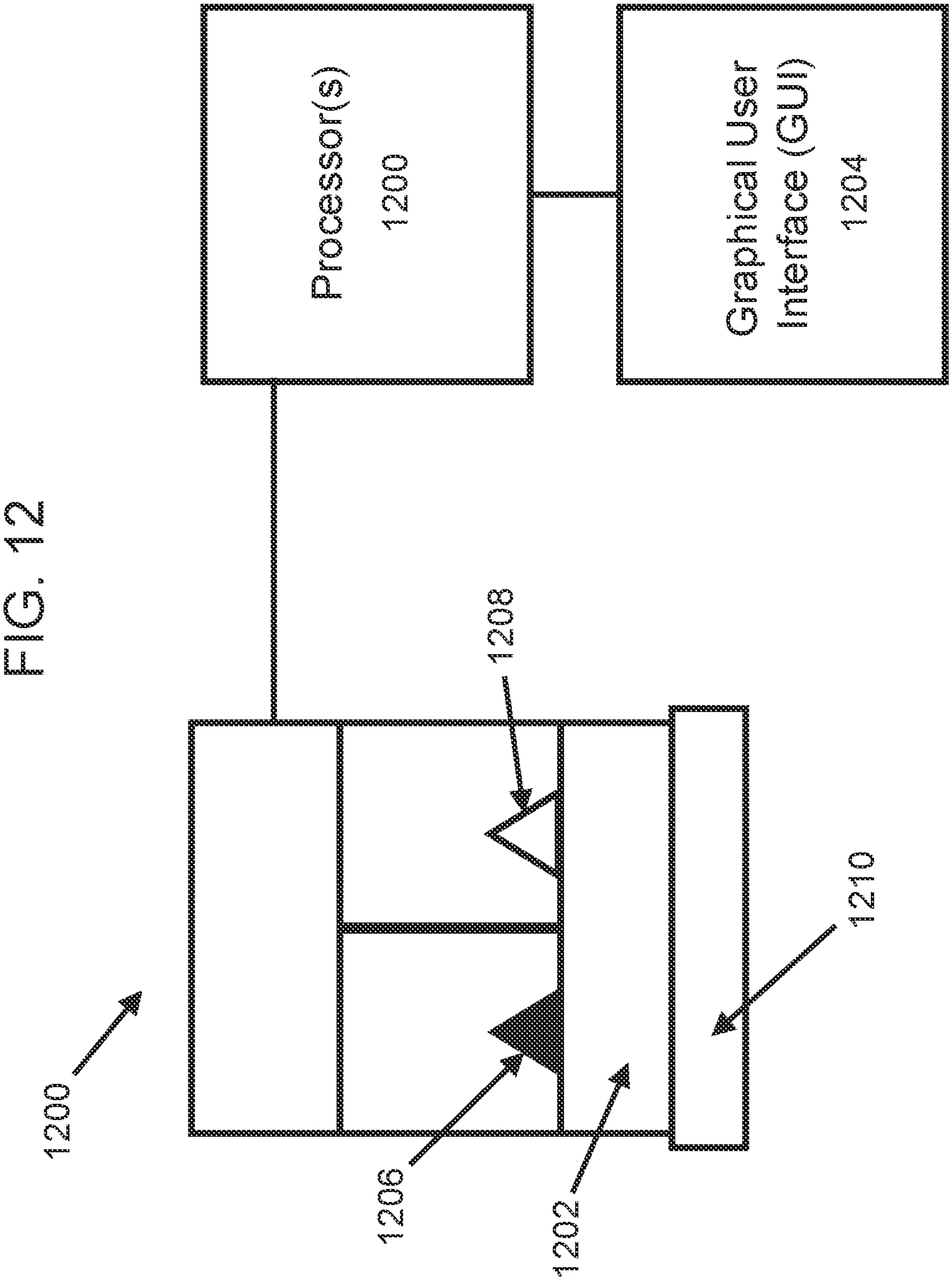
FIG. 12 is a block diagram for a multiplex assay system, according to some embodiments, configured for multiplexed analysis of biological materials using one or more multiplex assay devices (MADs) of some embodiments.

As shown in FIG. 12, in some embodiments, a multiplex assay system 1200 configured for multiplexed analysis of biological material is provided and includes a receiving area 1202 configured to receiving a plurality of multiplex assay devices (MADs) according to any such disclosed embodiments thereof (see above). The system can also include a graphical user interface 1204 configured to at least one of (and preferably all of) display information, output information from the system, receive input from a user, a fluorescing device 1206 configured to expose the opening of a second frame of each MAD to fluorescing light, an imager 1208 configured to image the capture agent (CA) slide and corresponding channels of the channel membrane upon the CA slide being exposed to the fluorescing light, an electronic reader 1210 configured to receive or otherwise obtain a code from each of the MADs, and one or more processors 1212 configured with computer instructions operational thereon to cause the system to perform the method comprising identifying each MAD via reading of a code of a respective MAD, confirming proper application of sealing membrane over the first openings of each MAD, incubating each MAD over a period of time, such that, one or more components of the biological samples loaded into the plurality of first openings bind to capture agents contained on the CA slide, flowing one or more reagents through the serpentine channel, activating the fluorescing device, imaging the CA slide from the opening in the second frame upon exposure of the CA slide to the fluorescing light, and generating one or more graphs, charts, and/or information based on the acquired image. One of skill in the art will appreciate that the disclosed system, in some embodiments, includes structure to aid in providing, pumping, and exhausting various fluids/materials to a MAD device, and may also include structure to aid in incubating materials within a MAD.

EXAMPLES

Example 1: Proper Sample Loading of Multiplex Assay Device (MAD)

Biological components were analyzed by the multiplex assay device (MAD), systems, and methods of the disclosure. Cell suspensions or supernatants from cultures of immune cells can be derived from, but are not limited to, T-cells, NK cells, Monocytes, or CAR-T cells. Cells can be stimulated with stimulants including, but not limited to, CD3, CD28, PMA, Ionomycin, and LPS. Cells can be cultured according to standard methods in the art.

Day 1: Thawing and Loading Protocol

The background control is the medium/buffer (i.e., complete RPMI) used for cell culture when the supernatants were preserved. The assay was validated with sample supernatant and background control using complete RPMI, as recommended in all sample prep protocols.

Remove vacuum sealed bag containing multiplex assay device (MAD) from storage at −20° C. MAD must stay sealed until loading.

2. Place MAD on a bench to thaw in the vacuum sealed bag at ambient temperature 30 to 60 minutes prior to loading the sample supernatant.

3. Allow frozen supernatants to completely thaw at room temperature. Mix well by pipetting up and down prior to loading. Use a larger volume pipette (e.g., 100-1000 μL) to mix, depending on volume of sample. P10 pipette used to dispense sample into the chip will not provide adequate mixing for volumes greater than 50 μL.

4. Remove MAD from vacuum sealed bag and place on a flat surface. Keep protective film on bottom of chip. Each well of the MAD must be loaded with supernatant or background control in numerical order and each well of a row must be filled before loading the wells of the next row. Wells 5, 6, 15, and 16 are labeled "B" and are designated for loading background controls. All other wells may be loaded with sample supernatant. All sample supernatant and background controls are loaded in duplicate. These duplicates do not serve as replicates because both wells are required to run the assay correctly.

5. Using a P10 pipette, load 5.5 μL of Sample 1 supernatant into MAD well 1, firmly inserting the pipette tip into the well to ensure the pipette tip creates a seal around the well opening. Discard pipette tip (FIG. 8A). Only dispense the sample to the first stop of the pipette to prevent bubbles from forming. Do not release the plunger. With the plunger still held at the first stop, wait for 2 seconds for the sample to load, then slowly remove the tip from the well to avoid disturbing the sample.

6. Repeat step 5 for duplicate loading of Sample 1 supernatant into MAD well 2. CRITICAL: Use a new pipette tip for each well to avoid introducing air bubbles into the sample.

7. Load 5.5 μL of Sample 2 supernatant into MAD wells 3 and 4, as described in the previous steps.

8. Load 5.5 μL of the background control into well 5. Wells 5, 6, 15, and 16 of the MAD are designated for loading background control and should not be loaded with sample supernatant. Table X illustrates how sample should be applied to the MAD.

9. After loading wells 1 through 5, invert the MAD and inspect sample fill length through the glass slide on the bottom of the chip. If any samples filled less than 50% of the length between the well input and first sample divider of the next row, lightly tap barcode end of chip perpendicular to benchtop to promote sufficient sample filling. Inspect sample fill during tapping and stop once each sample has loaded at least 50% of the well length (FIG. 8B). Tap MAD lightly. Excessive force can cause sample contamination into the adjacent wells.

10. Load 5.5 μL of background control into well 6.

11. Load remaining samples in duplicate into the remaining wells in order from well 7 to well 20, loading background controls into wells 15 and 16. Do not load out of order. Loading out of order may result in sample cross-contamination (See Table 1). If you have less than 10 samples, remaining wells can be left blank. All 4 background wells must be filled. Invert chip and inspect fill volume through the glass slide after each row of 5 wells is loaded to ensure each sample has filled at least 50% of the well length before loading the next row.

TABLE 1

Schematic depicting sample loading of MAD
Appendix 1. Multiplex Assay Device Sample Loading Template

| | | | | |
|---|---|---|---|---|
| Well 1: | Well 2: | Well 3: | Well 4: | Well 5: |
| Sample 1 | Sample 1 | Sample 2 | Sample 2 | Background |
| Well 6: | Well 7: | Well 8: | Well 9: | Well 10: |
| Background | Sample 3 | Sample 3 | Sample 4 | Sample 4 |
| Well 11: | Well 12: | Well 13: | Well 14: | Well 15: |
| Sample 5 | Sample 5 | Sample 6 | Sample 6 | Background |
| Well 16: | Well 17: | Well 18: | Well 19: | Well 20: |
| Background | Sample 7 | Sample 7 | Sample 8 | Sample 8 |

12. After loading all sample supernatant and background controls in duplicate, gently invert chip to inspect sample loading through glass slide. As shown in FIG. 8B, liquid should cover at least 50% of the length of the sample chamber. There should be a visible air gap between each sample in each row. In the event of sample loading errors and/or contamination between adjacent samples, as shown in FIG. 8C, affected wells should be noted on sample loading template and excluded from IsoSpeak analysis.

13. Once the CodePlex chip has been inspected for proper sample loading, apply the cover membrane (FIG. 8D):

A. Peel off the clear liner of the cover membrane completely, exposing the adhesive side of the tape. The plastic blade of the cover membrane applicator can be used to help separate the cover membrane from the liner.

B. Carefully align the cover membrane to the top of the MAD, using the white rubber seals and outlined engravings on the chip as guides.

C. Place the cover membrane down and use a finger to apply even pressure to smooth and seal the tape across the entire surface of the MAD.

D. Using the cover membrane Applicator provided in the MAD Kit, apply moderate pressure across the Cover Tape to fully seal it to the chip. Slide the flat blade of applicator back and forth several times over each portion of the tape, first lengthwise and then widthwise (FIG. 8D). Slide the blade until it touches the rubber seals on each end. Slight indents can be seen over the well inlet when sufficient sealing pressure is applied. Failure to properly seal the MAD with cover membrane may result in sample leakage and loss of data. Do not touch the center hole of the white rubber seals on either end of chip, as this may cause cross contamination in adjacent samples (FIG. 8E).

14. Once the MAD has been loaded and cover membrane has been applied, remove the blue protective tape from the bottom surface of the chip. Perform a final brief inspection of sample fill length and air gap between samples through the glass slide. Avoid contact with slide as residue/debris can interfere with imaging.

15. Load MAD immediately into the system comprising a receiving area, fluorescing device, and imager with the barcode facing up and towards you and with the magnet facing the system and start the assay. Handle MAD with care. Hold MAD by sides or barcode tab. DO NOT touch or apply pressure to the white rubber seals (input and output). DO NOT stack chips (FIG. 8E).

Example 2: Analysis of Cellular Components Using Multiplex Assay Device (MAD)

Biological samples were loaded into the MAD and analyzed as described in Example 1. CD8+ cell suspensions were cultured with CD3/CD28 stimulants for 24 hours at 37° C. and 5% CO2, then cell supernatant was removed and loaded into the MAD. Samples contained CD8+ cell supernatant treated with CD3 (10 μg/mL) and CD28 (10 μg/mL). Anti-CD3 antibody is deposited onto the well of a plate at 10 μg/mL at 4° C. overnight. Later the CD8+ cells are mixed with 5 μg/mL soluble anti-CD28 antibody and then incubated on the anti-CD3 antibody plate for 24 hours at 37° C., 5% CO2. Supernatant is recovered after 24 hours and loaded onto the MAD.

Figure 9B:
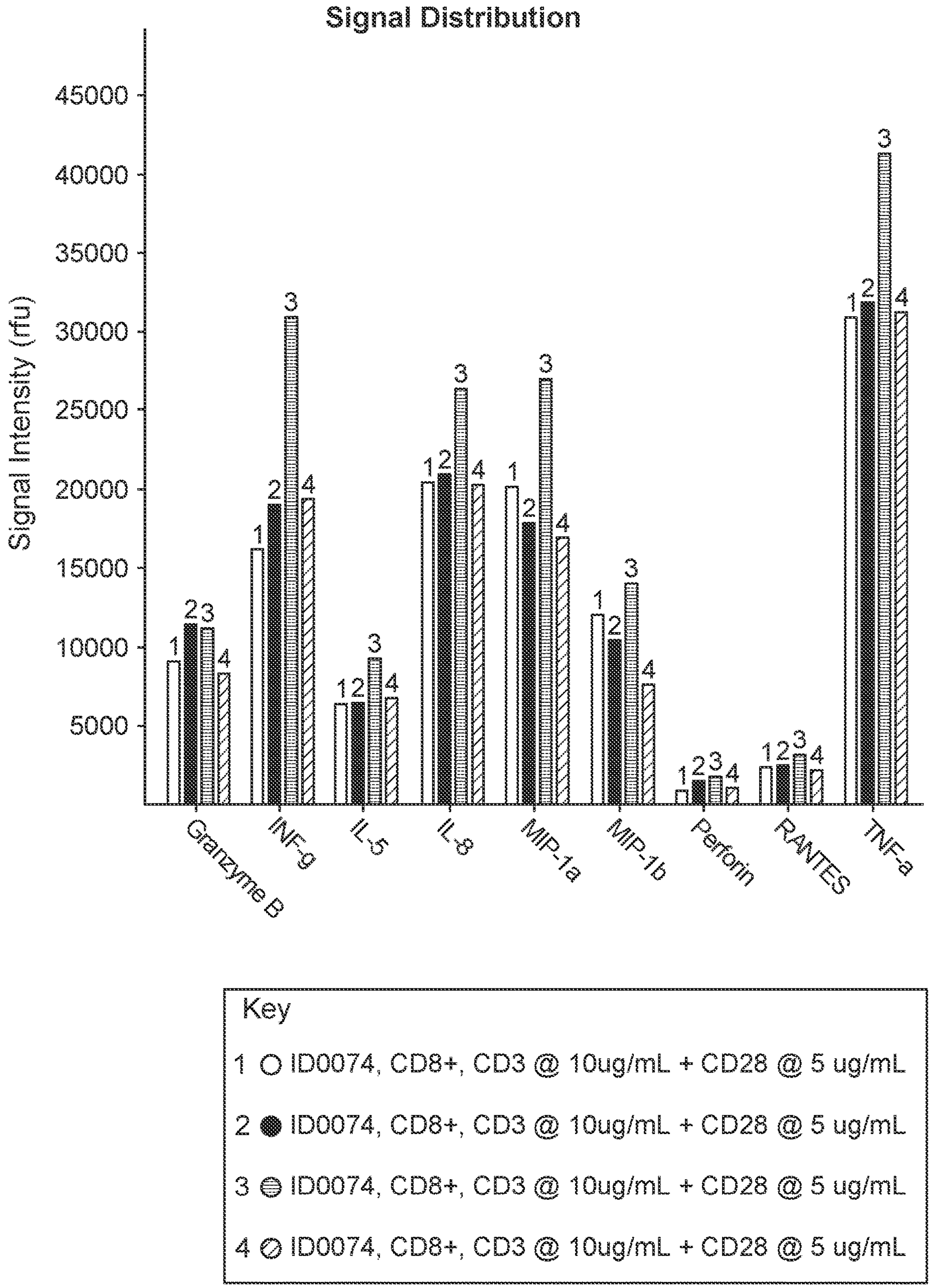
FIG. 9B is a graph depicting signal intensity for an array of cytokines (for example) detected in the array of first openings as depicted in FIG. 9A.

Samples were analyzed for the presence of granzyme B, IFN-g, IL-5, IL-8, MIP-1 alpha, MIP-1beta, perforin, CCL5 (regulated on activation, normal T cell expressed and secreted (RANTES)), TNF-alpha, CCL-11, GM-CSF, IL-12, IL-13, IL-15, IL-17A, IL-17F, IL-1b, IL-2, IL-21, IL-22, IL-4, IL-6, IL-7, IL-19, IP-10, MCP-1, MCP-4, TGFbeta1, TNF-beta, sCD137, and sCD40L. A capture agent array patterned with capture antibodies specific to these targets was utilized in the multiplex assay device. FIG. 9A is an image depicting the fluorescent antibodies in each opening containing a sample. Wells/openings containing background RPMI media do not show the presence of detected antibody aside from control bovine serum albumin (BSA) conjugated to FITC (fluorescein isothiocyanate) which provides a reference lane for detection of all adjacent antibody signals. FIG. 9B is a graph depicting the signal intensity of each of the detected analytes. The isolation of each sample in adjacent wells/openings without allowing for cross-contamination is confirmed in FIG. 10 where the presence of capillary stops corresponds to areas where no analytes were detected in the array. In certain embodiments, the MAD top surface is comprised of anodized aluminum which has very low background autofluorescence (averaging 250 relative florescence units), and thus a low background signal confirming it as an acceptable materials choice for MADs of the disclosure (FIG. 11). FIG. 11 also demonstrates that the cover membrane, a transparent polypropylene film with a silicone adhesive, has low autofluorescence allowing for fluorescent signals emanating from capture agents, including FITC, located beneath the cover seal can be detected.

Additional Remarks

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims, equivalents thereto, and any claims supported by the present disclosure, inventive embodiments may be practiced otherwise than as specifically described and claimed. Inventive embodiments of the present disclosure are directed to each individual feature, system, article, material, kit, method, functionality, and step, described herein. In addition, any combination of two or more such features, systems, articles, materials, kits, methods, and steps, if such features, systems, articles, materials, kits, methods, functionality, and steps, are not mutually inconsistent, is included within the inventive scope of the present disclosure. Embodiments disclosed herein may also be combined with one or more features, as well as complete systems, devices and/or methods, to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A multiplex assay device (MAD) configured for at least one of multiplexed analysis of biological material and a cell suspension incubator, the MAD comprising an assembly including:

a first frame including a plurality of first openings arranged in a plurality of rows, wherein each first opening extends from a first side of the first frame to a second side of the first frame;

a capture agent (CA) slide, wherein a plurality of capture agents are attached to a surface of the CA slide;

a channel membrane configured with:

a plurality of elongated slots configured as channels, each extending substantially from a first end of the channel membrane to a second end of the channel membrane, with a first side for positioning adjacent the first frame, and a second side to overlay the CA slide such that capture agents attached to the surface of the CA slide are within each channel of the plurality of channels;

and a second frame;

wherein the first frame is configured to couple with the second frame such that the CA slide and channel membrane are arranged therebetween; and each channel of the channel membrane is positioned below a respective first opening of the plurality of first openings such that a biological sample loaded into a respective first opening proliferates along at least a portion of the respective channel to interact with capture agents of the CA slide.

2. The device of claim 1, wherein the first frame is configured to removably couple with the second frame.

3. The device of claim 1, further comprising a cover membrane configured to cover the plurality of first openings.

4. The device of claim 3, wherein the cover membrane is configured to cover the first openings after a biological material sample has been pipetted into at least one of the first openings.

5. The device of claim 1, wherein each first opening includes identifiable indicia.

6. The device of claim 1, wherein at least one of the first openings in each row corresponds to a designated background opening (BO) for receiving background medium.

7. The device of claim 1, further comprising at least one capillary stop arranged adjacent at least one of the plurality of first openings.

8. The device of claim 1, further comprising at least one capillary stop arranged adjacent at least one of the plurality of first openings, wherein the at least one capillary stop is configured to prevent cross-contamination between adjacent first openings.

9. The device of claim 1, further comprising at least one capillary stop arranged adjacent at least one of the plurality of first openings, wherein the at least one capillary stop is configured to prevent cross-contamination between at least one first opening of a first row of the plurality of rows and at least one first opening of a second row of the plurality of rows adjacent the first row.

10. The device of claim 1, further comprising at least one input opening and at least one output opening.

11. The device of claim 10, wherein the at least one input opening is arranged on an end of the first frame.

12. The device of claim 10, wherein the at least one input opening extends from the first side of the first frame to the second side of the first frame.

13. The device of claim 10, wherein the at least one input opening is configured for receiving a flow.

14. The device of claim 10, wherein the at least one output opening is arranged on an end of the first frame.

15. The device of claim 10, wherein the at least one output opening extends from the first side of the first frame to the second side of the first frame.

16. The device of claim 10, wherein the at least one output opening is configured for exhausting a flow.

17. The device of claim 1, further comprising at least one flexible seal.

18. The device of claim 10, further comprising a flexible seal provided for the at least one input opening.

19. The device of claim 10, further comprising a pair of flexible seals, one each for sealing the at least one input opening and the at least one output opening.

20. The device of claim 19, further comprising a respective opening or recess arranged on the first frame for receiving a respective flexible seal of the pair of flexible seals.

21. The device of claim 19, wherein the first flexible seal of the pair of flexible seals is provided at a first end of the first frame, and the second flexible seal of the pair of flexible seals is provided at a second, opposite end of the first frame.

22. The device of claim 1, wherein the second frame includes an opening so as to image the CA slide and channels established by the channel membrane facing thereto.

23. The device of claim 10, wherein the first frame includes a plurality of passages connecting the at least one input to the at least one output via the plurality of channels of the channel membrane so as to establish a serpentine, serial channel.

24. The device of claim 10, wherein the first frame includes a plurality of passages connecting the at least one input to the at least one output via the plurality of channels of the channel membrane so as to establish a serpentine, serial channel, and wherein the plurality of passages includes a first passage connecting the at least one input to an end of the first channel of the channel membrane.

25. The device of claim 10, wherein the first frame includes a plurality of passages connecting the at least one input to the at least one output via the plurality of channels of the channel membrane so as to establish a serpentine, serial channel, and wherein the plurality of passages includes a second passage connecting the at least one output to an end of the last channel of the channel membrane.

26. The device of claim 10, wherein the first frame includes a plurality of third passages each for connecting every other adjacent end of adjacent channels such that the serpentine channel is established from the at least one input, serially through each channel, and optionally, to the at least one output.

27. A multiplex assay device (MAD) configured for multiplexed analysis of biological material comprising an assembly including:

a first frame including:

a plurality of first openings arranged in a plurality of rows, wherein:

each first opening including identifiable indicia and each extending from a first side of the first frame to a second side of the first frame, and each row including a designated background opening (BO) for receiving background medium;

a plurality of capillary stops arranged adjacent each of the plurality of first openings configured to prevent cross-contamination between at least one first opening of a first row of the plurality of rows and at least one first opening of a second row of the plurality of rows adjacent the first row, at least one input opening arranged on a first end of the first frame and extending from the first side of the first frame to the second side of the first frame and configured for receiving a flow, and at least one output opening arranged on a second end of the frame opposite the first end and extending from the first side of the frame to the second side of the frame and configured for exhausting the flow;

a first membrane configured to cover the plurality of first openings after a biological material sample has been pipetted into at least one of the first openings;

a capture agent (CA) slide;

a channel membrane configured:

with a plurality of elongated slots configured as channels, each extending substantially from a first end of the channel membrane to a second end of the channel membrane, the channels including a first channel and a last channel, with a first side for positioning adjacent the first frame, and a second side to overlay the CA slide such that capture agents contained on the slide are within each channel of the plurality of channels, a second frame;

a pair of flexible seals, each one provided for the at least one input opening and the at least one output opening, at a first end and a second end of the assembly adjacent or within a recess of the second housing or frame;

and a coded label for identifying the MAD, wherein:

the first frame is configured to removably couple with the second frame such that the CA slide and channel membrane are arranged therebetween, the second frame includes an opening so as to image the side of the CA slide and channels established by the channel membrane facing thereto, each channel of the channel membrane being positioned below at least one first opening of each row of first openings, such that a sample loaded into a respective first opening proliferates along at least a portion of the channel to interact with capture agents of the slide, and a plurality of passages connecting the at least one input to the at least one output via the plurality of channels of the channel membrane so as to establish a serpentine, serial channel, the plurality of passages including:

a first passage connecting the at least one input to an end of the first channel of the channel membrane, a second passage connecting the at least one output to an end of the last channel of the channel membrane, and a plurality of passages each for connecting every other adjacent end of adjacent channels such that the serpentine channel is established from the at least one input, serially through each channel to the at least one output.

28. A multiplex assay system configured for multiplexed analysis of biological material, the system comprising:

a receiving area configured to receive a plurality of multiplex assay devices (MADs) of claim 1;

a fluorescing device configured to expose at least one of the capture agent slides and corresponding channels of the channel membrane to fluorescing light;

and an imager configured to image at least one of the capture agent slides and corresponding channels of the channel membrane upon the capture agent slides and channels being exposed to the fluorescing light.

* * * * *